(12) United States Patent
Luo et al.

(10) Patent No.: US 11,438,124 B2
(45) Date of Patent: Sep. 6, 2022

(54) COORDINATION NOTIFICATIONS IN WIRELESS BACKHAUL SYSTEMS

(71) Applicant: QUALCOMM Incorporated, San Diego, CA (US)

(72) Inventors: Jianghong Luo, Skillman, NJ (US); Navid Abedini, Somerset, NJ (US); Junyi Li, Chester, NJ (US); Luca Blessent, Whitehouse Station, NJ (US); Tao Luo, San Diego, CA (US); Karl Georg Hampel, Hoboken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 16/988,175

(22) Filed: Aug. 7, 2020

(65) Prior Publication Data

US 2021/0067301 A1 Mar. 4, 2021

Related U.S. Application Data

(60) Provisional application No. 62/892,887, filed on Aug. 28, 2019.

(51) Int. Cl.
| | |
|---|---|
| *H04L 5/00* | (2006.01) |
| *H04W 72/04* | (2009.01) |
| *H04W 88/08* | (2009.01) |
| *H04W 24/10* | (2009.01) |
| *H04W 48/18* | (2009.01) |

(52) U.S. Cl.
CPC ........... *H04L 5/0053* (2013.01); *H04W 24/10* (2013.01); *H04W 48/18* (2013.01);
(Continued)

(58) Field of Classification Search
CPC ... H04L 5/0094; H04L 5/0005; H04J 11/0079
See application file for complete search history.

(56) References Cited

U.S. PATENT DOCUMENTS

| | | | |
|---|---|---|---|
| 2010/0190533 A1* | 7/2010 | Black | H04W 24/04 455/571 |
| 2017/0331577 A1 | 11/2017 | Parkvall et al. | |

(Continued)

FOREIGN PATENT DOCUMENTS

WO    WO-2018162158 A1    9/2018

OTHER PUBLICATIONS

International Search Report and Written Opinion—PCT/US2020/045631—ISA/EPO—Oct. 20, 2020.
(Continued)

*Primary Examiner* — Ayaz R Sheikh
*Assistant Examiner* — Debebe A Asefa
(74) *Attorney, Agent, or Firm* — Holland & Hart LLP; Kevin M. Donnelly

(57) ABSTRACT

Methods, systems, and devices for wireless communications are described to coordinate information across a wireless network. One or more access nodes of a wireless network may configure a time resource container for receiving, amplifying, and forwarding a signal, such as a notification signal, in an operating mode. A notification signal may include an indication of coordination information and may be transmitted or received in the time resource container, such as in a first subset of a set of time resources of the time resource container. An access node may first receive a signal from a second access node, amplify and forward the signal in the time resource container to a third access node, and then decode the received signal and determine whether the signal includes coordination information for the access node. If the signal includes coordination information for the access node, the access node may perform one or more actions.

29 Claims, 15 Drawing Sheets

(52) U.S. Cl.
CPC ..... *H04W 72/042* (2013.01); *H04W 72/0446* (2013.01); *H04W 88/08* (2013.01)

(56) References Cited

U.S. PATENT DOCUMENTS

| | | | |
|---|---|---|---|
| 2019/0044649 A1* | 2/2019 | Kim | H04L 1/00 |
| 2019/0098611 A1* | 3/2019 | Shimezawa | H04L 5/0053 |
| 2020/0044796 A1* | 2/2020 | Yang | H04L 5/0092 |

OTHER PUBLICATIONS

Qualcomm: "Smart Repeaters", 3GPP Draft, 3GPP TSG RAN Meeting #88e, RP-201140 3RD Generation Partnership Project (3GPP), Mobile Competence Centre, 650, Route Des Lucioles, F-06921, Sophia-Antipolis Cedex, France, vol. TSG RAN. No. Electronic Meeting; Jun. 29, 2020-Jul. 3, 2020, Jun. 22, 2020 (Jun. 22, 2020), XP051903779, 10 pages, Retrieved from the Internet: URL:https://ftp.3gpp.org/tsg_ran/TSG_RAN/TSGR_88e/Docs/RP-201140.zip RP-201140-Smart Repeaters Motivation.pdf [retrieved on Jun. 22, 2020] slides 2-4.

Qualcomm: "New SID on Smart Repeaters for NR," 3GPP Draft, 3GPP TSG RAN Meeting #88e, RP-201139, 3RD Generation Partnership Project (3GPP), Mobile Competence Centre, 650, Route Des Lucioles, F-06921, Sophia-Antipolis Cedex, France, vol. TSG RAN, No. Electronic Meeting, Jun. 29, 2020-Jul. 3, 2020, Jun. 22, 2020 (Jun. 22, 2020), XP051903778, 4 pages, Retrieved from the Internet: URL: https://ftp.3gpp.org/tsg_ran/TSG_RAN/TSGR_88e/Docs/RP-201139.zip RP-201139-Draft SID-on smart repeaters.doc [retrieved on Jun. 22, 2020] chapter 3.

* cited by examiner

COORDINATION NOTIFICATIONS IN WIRELESS BACKHAUL SYSTEMS

CROSS REFERENCE

The present Application for Patent claims the benefit of U.S. Provisional Patent Application No. 62/892,887 by LUO et al., entitled "COORDINATION NOTIFICATIONS IN WIRELESS BACKHAUL SYSTEMS," filed Aug. 28, 2019, assigned to the assignee hereof, and expressly incorporated by reference herein.

TECHNICAL FIELD

The following relates generally to wireless communications and more specifically to coordination notifications in wireless backhaul systems.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). For example, an LTE or NR base station may provide a mobile device access to the internet via the wireless network. Network access nodes may have a high-capacity, wired, backhaul connection (such as fiber) to the network. In some deployments, however, it may be desirable to deploy a larger quantity of access nodes (for example, in a small area) to provide greater coverage to UEs. In such deployments, it may be impractical to connect each access node to the network via a wired connection, and some networks or portions thereof may be configured as integrated access and backhaul (IAB) networks, in which one or more access nodes of the network may have wireless backhaul connections to the network.

In some IAB networks, signaling methods for communicating information may result in latency that may impact network performance.

SUMMARY

The described techniques relate to improved methods, systems, devices, and apparatuses that support coordination notifications in wireless backhaul systems. Generally, the described techniques provide for coordinating information across a network, such as an integrated access/backhaul (IAB) network. The IAB network may employ methods to coordinate information between access nodes in a time-sensitive manner, such as coordinating information regarding a delay-sensitive packet (for example, a packet related to low latency communications) or regarding synchronization loss affecting one or more access nodes. The wireless communications system may reduce latency associated with notifications related to delay propagation, for example, by supporting a notification signal that may be received and transmitted in an operating mode (such as a full-duplex mode). In some examples, the operating mode may include using an amplify-forwarding technique or mode.

The wireless communications system (for example, one or more access nodes of the wireless communications system) may configure a time resource container for receiving, amplifying, and forwarding a signal in the operating mode. The time resource container may occupy one symbol or a fraction of a symbol within a slot, and the time resource container may be aligned in time for at least some if not each access node in the network. The signal may include an indication of coordination information (for example, the signal may be or may include a notification signal) and may be transmitted or received in the time resource container. The signal may be communicated in a first subset of a set of time resources of the time resource container, such that a remainder (for example, after the first subset or before the first subset or both) of the time resource container may be used as a gap during which there may be no signal transmission or reception. In some other examples, the remainder of the time resource container may be used to receive one or more other signals or to transmit one or more other signals.

An access node may receive a signal in the time resource container and amplify and forward the signal to one or more parent or child access nodes while in the operating mode (for example, while concurrently receiving and transmitting, such as in a full-duplex mode). In some examples, the forwarded signal may include a notification signal, and in some examples, the forwarded signal may include noise. After receiving, amplifying, and forwarding the signal to corresponding child or parent access nodes, the access node may decode the signal to determine whether the signal includes coordination information that applies to the access node or another device in the network (for example, the access node may determine whether the signal is or includes a notification signal). If the signal includes coordination information that applies to the access node, the access node may perform one or more actions associated with the notification signal.

One innovative aspect of the subject matter described in this disclosure may be implemented in a method for wireless communication. The method includes determining a configuration of a time resource container for communicating an indication of coordination information associated with access nodes of a network, the time resource container including a set of time resources; enabling an operating mode for amplifying and forwarding a signal based on determining the configuration of the time resource container; receiving, from a second access node of the access nodes and while in the operating mode, a signal in a first subset of the set of time resources of the time resource container; and amplifying and forwarding, in the time resource container and while in the operating mode, the signal to a third access node of the access nodes, the forwarded signal including a notification signal including the indication of the coordination information.

Another innovative aspect of the subject matter described in this disclosure may be implemented in an apparatus for wireless communications at a first access node. The apparatus may include a processor, memory coupled with the processor, and instructions stored in the memory. The instructions may be executable by the processor to cause the apparatus to determine a configuration of a time resource container for communicating an indication of coordination information associated with access nodes of a network, the time resource container including a set of time resources; enable an operating mode for amplifying and forwarding a signal based on determining the configuration of the time resource container; receive, from a second access node of the access nodes and while in the operating mode, a signal in a first subset of the set of time resources of the time resource container; and amplify and forward, in the time resource container and while in the operating mode, the signal to a third access node of the access nodes, the forwarded signal including a notification signal including the indication of the coordination information.

Another innovative aspect of the subject matter described in this disclosure may be implemented in an apparatus for wireless communications at a first access node. The apparatus may include means for determining a configuration of a time resource container for communicating an indication of coordination information associated with access nodes of a network, the time resource container including a set of time resources; enabling an operating mode for amplifying and forwarding a signal based on determining the configuration of the time resource container; receiving, from a second access node of the access nodes and while in the operating mode, a signal in a first subset of the set of time resources of the time resource container; and amplifying and forward, in the time resource container and while in the operating mode, the signal to a third access node of the access nodes, the forwarded signal including a notification signal including the indication of the coordination information.

Another innovative aspect of the subject matter described in this disclosure may be implemented in a non-transitory computer-readable medium storing code for wireless communications at a first access node. The code may include instructions executable by a processor to determine a configuration of a time resource container for communicating an indication of coordination information associated with access nodes of a network, the time resource container including a set of time resources; enable an operating mode for amplifying and forwarding a signal based on determining the configuration of the time resource container; receive, from a second access node of the access nodes and while in the operating mode, a signal in a first subset of the set of time resources of the time resource container; and amplify and forward, in the time resource container and while in the operating mode, the signal to a third access node of the access nodes, the forwarded signal including a notification signal including the indication of the coordination information.

In some examples of the method, apparatuses, and non-transitory computer-readable medium, receiving the signal in the first subset may include operations, features, means, or instructions for receiving the signal including the indication of the coordination information.

Some examples of the method, apparatuses, and non-transitory computer-readable medium may further include operations, features, means, or instructions for storing the signal, and decoding the signal after amplifying and forwarding the signal to the third access node.

In some examples of the method, apparatuses, and non-transitory computer-readable medium, the notification signal includes one or more of a flag indicating a notification scheme, an access node association identifier (ID) indicating one or more access nodes of the access nodes that the notification signal may be intended for, a notification type indicating a cause of the notification signal, one or more actions to be performed by the first access node or one or more other access nodes, an action time indicating when to initiate an action after detection of the notification signal, or a delay-critical message or packet.

Another innovative aspect of the subject matter described in this disclosure may be implemented in a method of wireless communications at a first access node. The method may include determining coordination information associated with access nodes of a network; determining a configuration of a time resource container for communicating an indication of the coordination information associated with the access nodes, the time resource container including a set of time resources; and communicating, with a second access node of the access nodes and based on the configuration of the time resource container, a notification signal in a first subset of the set of time resources of the time resource container, in which the notification signal includes the indication of the coordination information.

Another innovative aspect of the subject matter described in this disclosure may be implemented in an apparatus for wireless communications at a first access node. The apparatus may include a processor, memory coupled with the processor, and instructions stored in the memory. The instructions may be executable by the processor to cause the apparatus to determine coordination information associated with access nodes of a network; determine a configuration of a time resource container for communicating an indication of the coordination information associated with the access nodes, the time resource container including a set of time resources; and communicate, with a second access node of the access nodes and based on the configuration of the time resource container, a notification signal in a first subset of the set of time resources of the time resource container, in which the notification signal includes the indication of the coordination information.

Another innovative aspect of the subject matter described in this disclosure may be implemented in an apparatus for wireless communications at a first access node. The apparatus may include means for determining coordination information associated with access nodes of a network; determining a configuration of a time resource container for communicating an indication of the coordination information associated with the access nodes, the time resource container including a set of time resources; and communicating, with a second access node of the access nodes and based on the configuration of the time resource container, a notification signal in a first subset of the set of time resources of the time resource container, in which the notification signal includes the indication of the coordination information.

Another innovative aspect of the subject matter described in this disclosure may be implemented in a non-transitory computer-readable medium storing code for wireless communications at a first access node. The code may include instructions executable by a processor to determine coordination information associated with access nodes of a network; determine a configuration of a time resource container for communicating an indication of the coordination information associated with the access nodes, the time resource container including a set of time resources; and communicate, with a second access node of the access nodes and based on the configuration of the time resource container, a notification signal in a first subset of the set of time resources of the time resource container, in which the notification signal includes the indication of the coordination information.

In some examples of the method, apparatuses, and non-transitory computer-readable medium, the notification signal includes one or more of a flag indicating a notification scheme, an access node association ID indicating one or more access nodes of the access nodes that the notification signal may be intended for, a notification type indicating a cause of the notification signal, one or more actions to be performed by the first access node or one or more other access nodes, an action time indicating when to initiate an action after detection of the notification signal, or a delay-critical message or packet.

DETAILED DESCRIPTION

Figure 1:
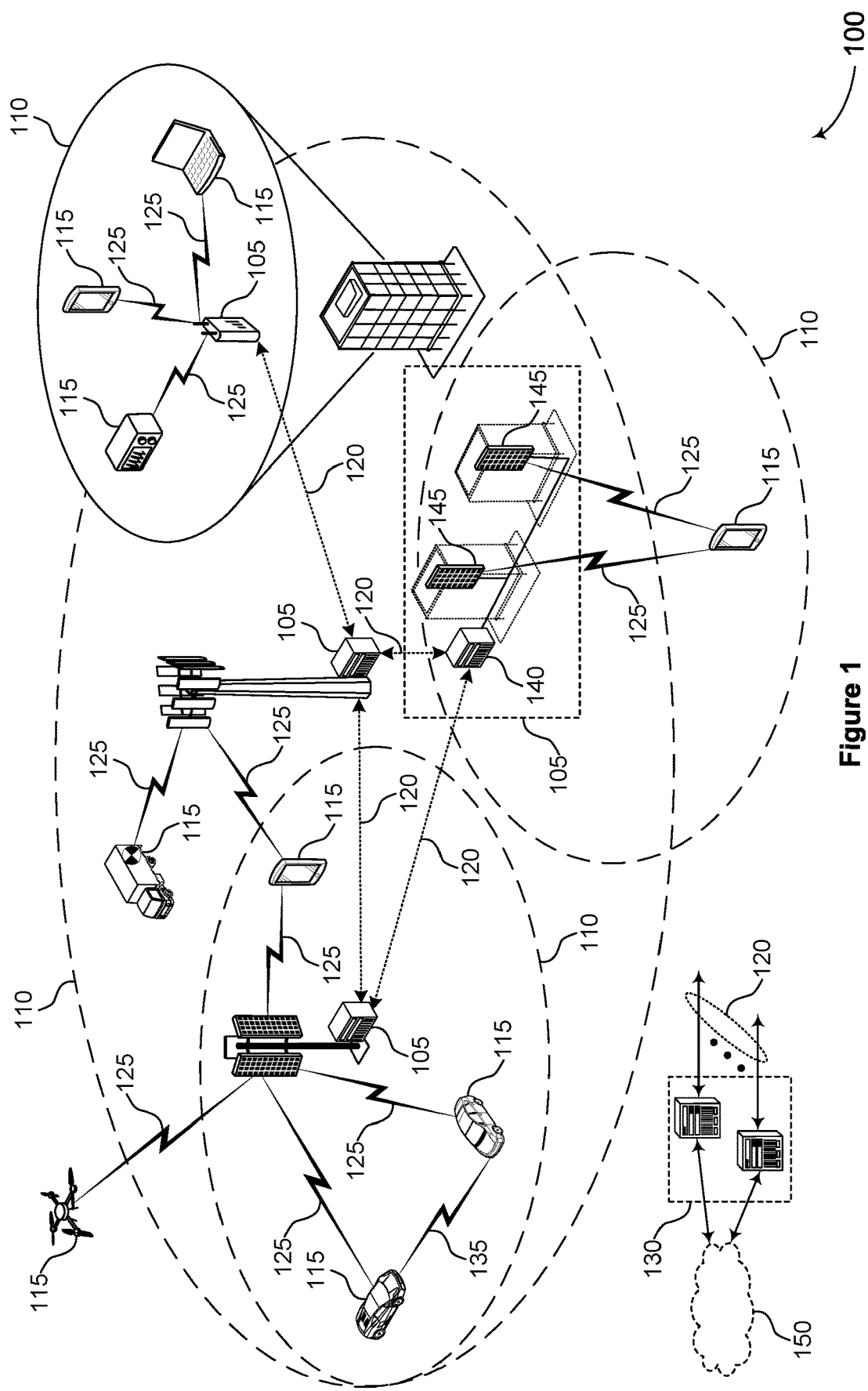
FIG. 1 illustrates an example of a wireless communications system that supports coordination notifications in wireless backhaul systems in accordance with aspects of the present disclosure.

Some existing wireless communications systems may support methods for coordinating information across multiple hops (for example, devices or access nodes) of a network, such as an integrated access/backhaul (IAB) network. For example, a wireless communications system may support notifying access nodes of a delivery of a delay-sensitive packet (such as an ultra-reliable low-latency (URLLC) packet) or notifying access nodes of a synchronization loss at one or more access nodes of the network. Some existing methods for coordination across a network may introduce problematic propagation or other delays or latency in operation. For example, some methods using semi-static coordination may involve long amounts of time to coordinate. Alternatively, other methods using dynamic coordination may introduce latency at each hop (for example, at each retransmission) based on decoding and processing times at one or more access nodes before propagating information to the next device in the network (for example, using a decode-and-forward technique). The wireless communications systems and techniques described herein may reduce latency associated with coordination notifications by supporting a coordination notification signal that may be received and transmitted in a full-duplex operating mode via an amplify-forwarding technique.

The wireless communications system (for example, a device such as an access node in the system) may configure a time resource container for transmitting, receiving, amplifying, or forwarding a signal, such as a notification signal, using a full-duplex operating mode. The time resource container may occupy one symbol or a fraction of a symbol (for example, a fraction that is less than one symbol) within a slot, and a time resource container may be aligned in time for at least some if not each access node in the network. The signal, as described herein, may include an indication of coordination information (for example, the signal may be a notification signal for coordinating between access nodes) and may be transmitted or received, or both, in the time resource container. The signal may be communicated in a first subset of a set of resources of the time resource container, such that a remainder (for example, a subset of resources after the first subset or before the first subset or both) of the time resource container may be used as a gap during which there may be no signal transmission or reception. In some other examples, the remainder of the time resource container may be used to receive one or more other signals or to transmit one or more other signals.

If the signal is directed in the uplink direction, an access node may receive the signal and amplify and forward the signal to one or more associated parent access nodes. Similarly, if the signal is directed in the downlink direction, the access node may receive the signal and amplify and forward the signal to one or more associated child access nodes. In some examples, the forwarded signal may include a notification signal. Additionally or alternatively, in some examples the forwarded signal may include noise. The time resource container may be configured such that coordination information (such as information transmitted via a notification signal) may be received by one or more access nodes or each access node of the network within the time resource container.

For example, an access node may receive a signal from another access node, may amplify and forward the signal to one or more parent or child access nodes while operating in a full-duplex operating mode (for example, while concurrently receiving the signal or one or more other signals), and may store and decode the signal (for example, after forwarding the signal) to determine whether the signal includes coordination information (for example, if the signal is a notification signal) that applies to the access node, or one or more other access nodes related to the access node, among other examples. An access node may decode the signal and, if the signal includes information regarding the access node, may perform one or more actions based on information in, or that can be determined from, information in the notification signal.

In some examples, information in or indicated by the signal, such as the notification signal, may include one or more of an on-off flag, an access node identifier (ID), a notification type indicating the cause of the notification signal, one or more actions to be taken by an identified access node, or a time corresponding to the one or more actions. If the notification signal includes coordination information that applies to the access node, the access node may perform one or more actions associated with the notification signal or indicated within the notification signal.

Various aspects generally relate to coordination signaling, for example, within an IAB network, and more specifically, to amplifying and forwarding a signal within a configured time window. For example, a first access node (such as a parent access node or child access node) may transmit signaling (such as coordination information or other information) to a second access node (such as a parent or child of the first access node) within a configured time window. The second access node may amplify and forward the signaling within the configured time window, for example, concurrently with receiving the signaling within the configured time window. This process may continue from one access node to another until reaching an intended last access node (such as a child access node or donor access node). Particular aspects of the subject matter described in this disclosure may be implemented to realize one or more potential advantages. The techniques employed by the described communication devices may provide benefits and enhancements to the operation of the communication devices. For example, these techniques may increase the speed of notification and other signaling within a wireless network (such as an IAB network) and may reduce delays and latency within the wireless network, among other benefits.

Aspects of the disclosure are initially described in the context of wireless communications systems. Aspects of the disclosure are further illustrated by and described with reference to signaling configurations, a process flow, apparatus diagrams, system diagrams, and flowcharts that relate to coordination notifications in wireless backhaul systems.

FIG. 1 illustrates an example of a wireless communications system 100 that supports coordination notifications in wireless backhaul systems in accordance with aspects of the present disclosure. The wireless communications system 100 may include one or more network devices 105 (such as base stations or access nodes), one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (such as mission critical) communications, low latency communications, communications with low-cost and low-complexity devices, or any combination thereof.

The network devices 105 may be dispersed throughout a geographic area to form the wireless communications system 100 and may be devices in different forms or having different capabilities. The network devices 105 and the UEs 115 may wirelessly communicate via one or more communication links 125. Each network device 105 may provide a coverage area 110 over which the UEs 115 and the network device 105 may establish one or more communication links 125. The coverage area 110 may be an example of a geographic area over which a network device 105 and a UE 115 support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, network devices 105, or network equipment (such as core network nodes, relay devices, IAB nodes, or other network equipment), as shown in FIG. 1.

The network devices 105 may communicate with the core network 130, or with one another, or both. For example, the network devices 105 may interface with the core network 130 through one or more backhaul links 120 (such as via an S1, N2, N3, or other interface). The network devices 105 may communicate with one another over the backhaul links 120 (such as via an X2, Xn, or other interface) either directly (such as directly between network devices 105), or indirectly (such as via the core network 130), or both. In some examples, the backhaul links 120 may be or include one or more wireless backhaul links, such as in an IAB network.

One or more of the network devices 105 described herein may include or may be referred to by a person of ordinary skill in the art as a base transceiver station, a radio base station, an access point, a network node, an access node, an IAB node, a wireless node, a radio transceiver, a NodeB, an eNodeB (eNB), a next-generation NodeB or giga-NodeB (either of which may be referred to as a gNB), a Home NodeB, a Home eNodeB, or other suitable terminology. The wireless communications system 100 may include network devices 105 of different types (such as macro or small cell base stations, donor network devices including a central unit (CU) connected to the core network 130, relay network devices including mobile-termination (MT) functionality and distributed unit (DU) functionality).

The UE 115 may include or may be referred to as a mobile device, a wireless device, a remote device, a handheld device, or a subscriber device, or some other suitable terminology in which the "device" may also be referred to as a unit, a station, a terminal, or a client, among other examples. The UE 115 may also include or may be referred to as a personal electronic device such as a cellular phone, a personal digital assistant (PDA), a tablet computer, a laptop computer, or a personal computer. In some examples, the UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as other UEs 115 that may sometimes act as relays as well as network devices 105 and network equipment including macro eNBs or gNBs, small cell eNBs or gNBs, or relay base stations, among other examples, as shown in FIG. 1.

The UEs 115 and the network devices 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (such as a bandwidth part (BWP)) that is operated according to physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with the UE 115 using carrier aggregation or multi-carrier operation. The UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a network device 105, or downlink transmissions from a network device 105 to a UE 115. Carriers may carry downlink or uplink communications (such as in an FDD mode) or may be configured to carry downlink and uplink communications (such as in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (such as 1.4, 3, 5, 10, 15, 20, 40, or 80 megahertz (MHz)). Devices of the wireless communications system 100 (such as the network devices 105, UEs 115, or both) may have hardware configurations that support communications over a particular carrier bandwidth or may be configurable to support communications over one of a set of carrier bandwidths. In some examples, the wireless communications system 100 may include network devices 105, UEs 115, or both that support simultaneous communications via carriers associated with multiple carrier bandwidths. In some examples, each served UE 115 may be configured for operating over portions (such as a sub-band, a BWP) or all of a carrier bandwidth.

Signal waveforms transmitted over a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (such as a duration of one modulation symbol) and one subcarrier, in which the symbol period and subcarrier spacing are inversely related. The quantity of bits carried by each resource element may depend on the modulation scheme (such as the order of the modulation scheme, the coding rate of the modulation scheme, or both). Thus, the more resource elements that the UE 115 receives and the higher the order of the modulation scheme, the higher the data rate may be for the UE 115. A wireless communications resource may refer to a combination of a radio frequency spectrum resource, a time resource, and a spatial resource (such as spatial layers or beams), and the use of multiple spatial layers may further increase the data rate or data integrity for communications with a UE 115.

One or more numerologies for a carrier may be supported, in which a numerology may include a subcarrier spacing ($\Delta f$) and a cyclic prefix. A carrier may be divided into BWPs having the same or different numerologies. In some examples, a UE 115 may be configured with multiple BWPs. In some examples, a single BWP for a carrier is active at a given time, and communications for the UE 115 may be restricted to active BWPs.

The Time intervals for the network devices 105 or the UEs 115 may be expressed in multiples of a basic time unit which may, for example, refer to a sampling period of $T_s=1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some examples, a frame may be divided (such as in the time domain) into subframes, and each subframe may be further divided into a number of slots. Alternatively, each frame may include a variable number of slots, and the number of slots may depend on subcarrier spacing. Each slot may include a number of symbol periods (such as depending on the length of the cyclic prefix prepended to each symbol period). In some wireless communications systems 100, a slot may further be divided into multiple mini-slots containing one or more symbols. Excluding the cyclic prefix, each symbol period may contain one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some examples, the TTI duration (such as the number of symbol periods in a TTI) may be variable. Additionally or alternatively, the smallest scheduling unit of the wireless communications system 100 may be dynamically selected (such as in bursts of shortened TTIs (sTTIs)).

One or more physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (such as a control resource set (CORESET)) for a physical control channel may be defined by a number of symbol periods and may extend across the system bandwidth or a subset of the system bandwidth of the carrier. One or more control regions (such as CORESETs) may be configured for a set of the UEs 115. For example, the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

Each network device 105 may provide communication coverage via one or more cells, for example, a macro cell, a small cell, a hot spot, or other types of cells, or various combinations thereof. The term "cell" may refer to a logical communication entity used for communication with a network device 105 (such as over a carrier) and may be associated with an identifier for distinguishing neighboring cells (such as a physical cell identifier (PCID), a virtual cell identifier (VCID), or others). In some examples, a cell may also refer to a geographic coverage area 110 or a portion of a geographic coverage area 110 (such as a sector) over which the logical communication entity operates. Such cells may range from smaller areas (such as a structure, a subset of structure) to larger areas depending on various factors such as the capabilities of the network device 105. For example, a cell may be or include a building, a subset of a building, or exterior spaces between or overlapping with geographic coverage areas 110, among other examples.

A macro cell generally covers a relatively large geographic area (such as several kilometers in radius) and may allow unrestricted access by UEs 115 with service subscriptions with the network provider supporting the macro cell. A small cell may be associated with a lower-powered network device 105, as compared with a macro cell, and a small cell may operate in the same or different (such as licensed, unlicensed) frequency bands as macro cells. Small cells may provide unrestricted access to UEs 115 with service subscriptions with the network provider or may provide restricted access to UEs 115 having an association with the small cell (such as UEs 115 in a closed subscriber group (CSG), or UEs 115 associated with users in a home or office, among other examples). A network device 105 may support one or multiple cells and may also support communications over the one or more cells using one or multiple component carriers.

In some examples, a network device 105 may be movable and therefore provide communication coverage for a moving geographic coverage area 110. In some examples, different geographic coverage areas 110 associated with different technologies may overlap, but the different geographic coverage areas 110 may be supported by the same network device 105. In other examples, the overlapping geographic coverage areas 110 associated with different technologies may be supported by different network devices 105. The wireless communications system 100 may include, for example, a heterogeneous network in which different types of the network devices 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable, low-latency or mission critical communications. UEs 115 may be designed to support ultra-reliable, low-latency, or critical functions (such as mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (such as using a peer-to-peer (P2P) or D2D protocol). One or more UEs 115 utilizing D2D communications may be within the geographic coverage area 110 of a network device 105. Other UEs 115 in such a group may be outside the geographic coverage area 110 of a network device 105 or be otherwise unable to receive transmissions from a network device 105. In some examples, groups of UEs 115 communicating via D2D communications may utilize a one-to-many (1:M) system in which each UE 115 transmits to every other UE 115 in the group. In some examples, a network device 105 facilitates the scheduling of resources for D2D communications. In other cases, D2D communications are carried out between UEs 115 without the involvement of a network device 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by network devices 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a network device 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or network device 105 may be distributed across various network devices (such as radio heads and ANCs) or consolidated into a single network device (such as a network device 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (such as less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as network devices 105 and UEs 115 may employ carrier sensing for collision detection and avoidance. In some examples, operations in unlicensed bands may be based on a carrier aggregation configuration in conjunction with component carriers operating in a licensed band (such as LAA).

Operations in unlicensed spectrum may include downlink transmissions, uplink transmissions, P2P transmissions, or D2D transmissions, among other examples.

A network device 105 or UE 115 may be equipped with multiple antennas, which may be used to employ techniques such as transmit diversity, receive diversity, multiple-input multiple-output (MIMO) communications, or beamforming. The antennas of a network device 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network device 105 may be located in diverse geographic locations. A network device 105 may have an antenna array with a number of rows and columns of antenna ports that the network device 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (such as a network device 105 or a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

A network device 105 or UE 115 may use beam sweeping techniques as part of beam forming operations. For example, a network device 105 may use multiple antennas or antenna arrays (such as antenna panels) to conduct beamforming operations for directional communications with a UE 115. Some signals (such as synchronization signals, reference signals, beam selection signals, or other control signals) may be transmitted by a network device 105 multiple times in different directions. For example, the network device 105 may transmit a signal according to different beamforming weight sets associated with different directions of transmission. Transmissions in different beam directions may be used to identify (such as by a transmitting device, such as a network device 105, or a receiving device, such as a UE 115) a beam direction for subsequent transmission or reception by the network device 105.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a network device 105 or core network 130 supporting radio bearers for user plane data. At the Physical layer, transport channels may be mapped to physical channels.

The network devices 105 may support the functionality for an IAB network operation. For example, the network devices 105 may be split into one or more support entities (such as functionalities) for promoting wireless backhaul density in collaboration with communication access. In some examples, a network device 105 (such as a donor network device or donor IAB node) may be split into associated CU and DU entities in which one or more DUs may be partially controlled by an associated CU. The CU entity of the network device 105 may facilitate connection between the core network 130 and the network device (such as an access node), for example, via a wireline connection or a wireless connection to the core network 130. The one or more DUs of the network device 105 may control or schedule functionality for one or more additional devices (such as one or more of the alternative network devices 105 or the UEs 115) according to configured access and backhaul links. Based on the supported CU and DU entities at a network device 105, such a network device 105 may be referred to as a donor base station (such as an IAB donor or donor node).

Additionally, in some examples, a network device 105 may be split into associated MT and DU entities in which the MT functionality of the network device 105 may be controlled or scheduled by the DU entities of the one or more donor base stations (such as via a Uu interface). The DUs associated with such a network device 105 may be controlled by MT functionality. In addition, the DUs of the network device 105 may be at least partially controlled by signaling messages from the CU entities of the associated donor network devices (such as donor nodes) on the configured access and backhaul links of a network connection (such as via an F1-application protocol (AP)). The DUs of the one or more network devices 105 may support one of multiple serving cells of a network coverage area. The DUs of the one or more network devices 105 may control or schedule functionality for additional devices (such as one or more of the alternative network devices 105 or the UEs 115) according to the configured access and backhaul links. Based on supported MT and DU entities at a network device 105, the network device 105 may be referred to as an intermediate access node (such as an IAB relay node).

As discussed above, in wireless communications system 100, one or more network devices 105 (such as donor network devices or donor IAB nodes) may include one or more CUs and one or more DUs, in which one or more DUs associated with a donor base station may be partially controlled by a CU associated with the donor base station. A CU may be a component of a network management function, a database, a data center, or a core network 130 (such as a 5G NR core network (5GC)). A CU may communicate with the core network 130 via a backhaul link 132 (such as a wireline backhaul, or a wireless backhaul). In IAB networks, a CU (such as a donor network device 105) may communicate with the core network 130 (such as the 5GC) via a backhaul link 132 (such as a wireline backhaul, or wireless backhaul).

The donor network device 105 may be referred to, for example, in an IAB network, as an IAB donor and may be in communication with one or more IAB nodes (such as other network devices 105) operating as one or more DUs relative to the IAB donor and one or more UEs.

For example, an IAB network may include a chain of wireless devices (such as: starting with a donor network device 105, a radio access network (RAN) node that terminates an interface with the core network, and ending with a UE 115, with any number of relay nodes in between). Intermediate or relay network devices (for example, intermediate access nodes, parent access nodes, child access nodes, IAB nodes, relay base stations, relay nodes) may support MT functionality (which may also be referred to as UE function (UE-F)) controlled and scheduled by an IAB donor, or another parent network device, such as a parent access node. Such network devices may also support DU functionality (which may also be referred to as an access node function (AN-F)) relative to one or more additional entities (such as IAB nodes and UEs) within the relay chain or configuration of the access network (such as downstream). In some examples, MT functionality may refer to an implementation that supports at least some aspects of an MT or a UE. These relay mechanisms may forward traffic along to the additional entities, extend the range of wireless access for one or more base stations, or enhance the density of backhaul capability within serving cells.

In some examples, wireless communications system 100 may employ one or more wired and wireless backhaul links (such as backhaul link 132 or backhaul link 134) for establishing connectivity between a core network (such as the core network 130) and the one or more wireless nodes within the wireless communications system 100. For example, the wireless communications system 100 may include multiple network devices 105 (such as base stations or remote radio heads), in which at least one network device 105 is coupled with a wireline backhaul link, such as an optical fiber cable. Additional network devices 105 may not be directly coupled with the core network 130 or to another network devices 105 via a wired backhaul link, and may use wireless backhaul links to communicate backhaul traffic. In such cases, the network devices 105 may wirelessly communicate backhaul access traffic to a high-capacity fiber point (such as a location in which a network device is coupled with a wireline link to core network 130). Each of the backhaul links 132 and 134 may carry packets from the one or more established PDN gateways through an interface and subsequently direct the packets through the core network and to the coupled wireless nodes over the interface.

A wireless communications system may support notifying one or more access nodes (such as the network devices 105 or the UEs 115) of a delivery of a delay-sensitive packet, or notifying one or more access nodes of a synchronization loss at one or more access nodes of the network. The wireless communications system may reduce latency associated with such coordination notifications by supporting a notification signal that may be received and transmitted in a full-duplex operating mode, for example, via an amplify-forwarding technique. The wireless communications system (for example, one or more access nodes of the wireless communications system) may configure one or more time resource containers for receiving, amplifying, and forwarding a signal, which may be or include a notification signal, in a full-duplex operating mode (for example, in a downlink direction or an uplink direction or both). A time resource container of the one or more time resource containers may occupy one symbol or a fraction of a symbol (for example, a subset) within a slot, and a time resource container may be aligned in time for one or more access nodes or each access node in the network.

A notification signal may include an indication of coordination information and may be transmitted or received in the time resource container. A signal (such as a notification signal) may be transmitted in a first subset of a set of resources of the time resource container, such that other subsets of the time resource container may be used as a gap during which there may be no signal transmission or reception. In some other examples, the remainder of the time resource container may be used to receive one or more other signals or to transmit one or more other signals. An access node may amplify and forward a signal received in the time resource container (such as the notification signal) to corresponding child or parent access nodes and may store and decode the signal. If the signal includes coordination information that applies to the access node or one or more other access nodes related to the access node (for example, if the signal is a notification signal), the access node may perform one or more actions associated with the notification signal.

Figure 2A:
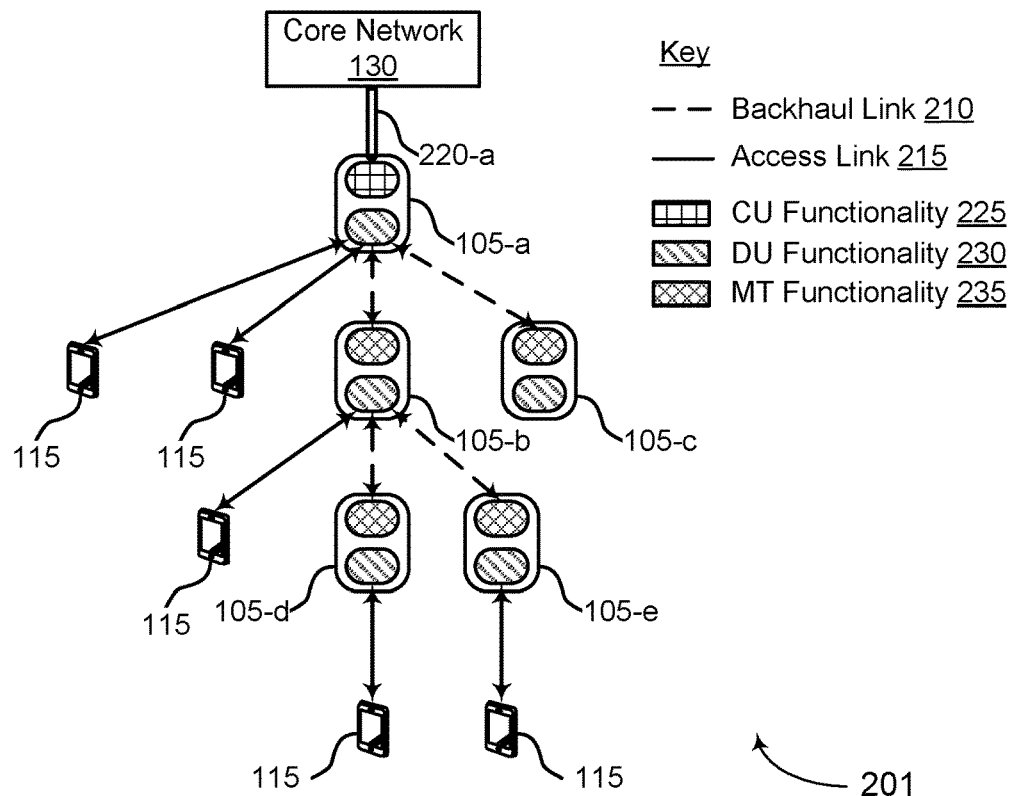
FIGS. 2A and 2B illustrate examples of wireless communications systems that support coordination notifications in wireless backhaul systems in accordance with aspects of the present disclosure.

FIG. 2A illustrates an example of a wireless communications system 201 that supports coordination notifications in wireless backhaul systems in accordance with aspects of the present disclosure. In some examples, the wireless communications system 201 may implement aspects of the wireless communications system 100 described with reference to FIG. 1. For example, the wireless communications system 201 may be an NR system that supports the sharing of infrastructure and spectral resources for NR access with wireless backhaul link capabilities, supplementing wireline backhaul connections, and providing an IAB network architecture. The wireless communications system 201 may include a core network 130 (such as an NGC) and one or more network devices 105 (such as one or more base stations/IAB nodes that may operate as parent access nodes, intermediate access nodes, or child access nodes) that may be split into one or more support entities (such as functionalities) to improve the efficiency of the network communications.

The wireless communications system 201 may include a donor network device 105-*a* (such as a donor IAB node or donor base station) split into an associated CU 225 functionality and DU 230 functionality, in which the DU 230 associated with the donor network device 105-*a* may be partially controlled by the CU 225 of the network device 105-*a*. In some examples, the CU 225 and the DU 230 may be located within a single device. In other examples, the DU 230 of the donor network device 105-*a* may be externally located and may be in wired or wireless communication with the CU 225. The CU 225 may be a component of a database, data center, core network, or network cloud, and may host layer 2 (L2) functionality and signaling (such as RRC, service data adaption protocol (SDAP), or PDCP).

The CU 225 of the donor network device 105-*a* may communicate with the core network 130 over a backhaul connection 220-*a*, for example, an NG interface (which may be an example of a portion of a backhaul link). The DU 230 may host lower layer, such as layer 1 (L1) and L2 functionality and signaling (such as RLC, MAC, or physical (PHY)). The DU 230 of the donor network device 105-*a* may support one of multiple serving cells of the network coverage according to connections associated with backhaul links 210 and access links 215 of the IAB network. The DU 230 of the donor network device 105-*a* may control one or more of the access links 215 and the backhaul links 210 within the corresponding network coverage and provide controlling and scheduling for child devices such as relay network devices 105 (intermediate access nodes) or UEs 115.

Each of the network devices 105 (relay or intermediate network devices 105) may be split into associated MT 235 and DU 230 functionalities (or entities). The MT 235 functionality (such as UE-F) of each network device 105 may be controlled or scheduled by one or more antecedent (for example, parent) network devices 105 (such as parent access nodes). For example, an access node may be controlled or scheduled by a donor access node, or another upstream access node of the established connectivity via the access links 215 and the backhaul links 210 of a coverage area. A DU 230 of a network device 105 may be controlled by an MT 235 of the network device 105. In addition, the DU 230 of the network device 105 may be partially controlled by signaling messages from the CU 225 entities of the associated donor network devices 105 (such as the donor network device 105-a) of the network connection (such as via an F1-AP interface). The DU 230 of the network device 105 may support one of multiple serving cells of the network coverage area. The DU 230 functionality (such as AN-F) may schedule one or more of the child network devices 105 (such as child access nodes) or the UEs 115, and may control one or more of the access links 215 or the backhaul links 210 under coverage of the DU 230.

An IAB donor (or an "anchor") may refer to a network device 105 that has a wireline connection to the core network 130 (such as backhaul connection 220-a), and an IAB node may refer to a network device 105 that relays traffic to or from the donor through one or more hops. IAB networks may thus share resources between access links 215 and backhaul links 210, and may reuse aspects of access network frameworks.

The wireless communications system 201 may implement 5G NR technologies (such as millimeter wave (mmW)) to support an access network (for example, between each access node, such as between one or more network devices 105 or one or more associated UEs 115) and a backhaul network (for example, between access nodes, such as network devices 105).

As described herein, a network device 105 operating as an intermediate access node may relay communications between a network device 105 operating as a parent access node (such as an IAB donor or an IAB node upstream or higher on the relay chain) and a network device 105 operating as a child access node (such as an IAB node downstream or lower on the relay chain) or a UE 115. In some examples, an intermediate access node may refer to the DU 230 or AN-F of a relay network device 105. A child device may refer to an IAB node (such as the MT 235 of the IAB node) or a UE 115 that is the child of another IAB node. As described herein, an IAB node may include the MT 235 function and the DU 230 function. For example, an MT 235 of a network device 105-b may act as or serve as a scheduled node (similar to a UE 115) that is scheduled by a parent access node (such as the network device 105-a). The DU 230 of the network device 105-b may act as or serve as a scheduling node that schedules child devices of the network device 105-b (such as a UE 115). The DU 230 of the network device 105-a may also schedule child IAB nodes downstream in the relay chain (such as a network device 105-d or 105-e).

Other IAB networks may support various resource management configurations for half-duplex communications, such as TDM communications or spatial division multiplexing (SDM) communications. A resource management framework may include a semi-static configuration of resource patterns implemented by a CU 225, with hard, soft, or not-available resource types. Additionally or alternatively, a resource management framework may include dynamic control of soft resources of a child access node DU 230 by a parent access node.

In a different manner, however, in some examples, the wireless communications system 201 may support methods for coordinating information across multiple hops or levels of an IAB network efficiently and effectively. For example, the wireless communications system 201 may support notifying one or more access nodes of a delivery of a delay-sensitive packet (such as a URLLC packet) or notifying access nodes of a synchronization loss at one or more nodes of the network. The wireless communications system 201 may reduce a latency associated with such notifications by supporting a notification signal (such as an indication of coordination information) that may be received and transmitted by a device in a full-duplex operating mode via an amplify-forwarding technique. For example, the wireless communications system 201 (for example, one or more devices within the wireless communications system 201 such as a donor network device 105-a) may configure a time resource container for receiving and transmitting (such as amplifying and forwarding) a signal, such as a notification signal, that may include an indication of coordination information.

An access node (such as network device 105-b) may receive the signal from a connected access node (such as network device 105-a or network device 105-d), may amplify and forward the signal (which may be or include the received signal or may be a different signal) to one or more parent or child access nodes (such as network device 105-d or network device 105-a depending on communication being in a downlink direction or an uplink direction) while operating in a full-duplex operating mode. The access node may store and decode the signal after the forwarding to determine whether the signal includes coordination information (for example, if the signal is a notification signal) that applies to the access node or to other access nodes. The time resource container may be configured such that coordination information associated with an event (such as information transmitted via the notification signal) may be received by one or more access nodes of the IAB network within a same time resource container, as described more with reference to FIG. 3A and FIG. 3B. If the notification signal includes information regarding the access node, the access node may perform one or more actions based on the signal.

Figure 2B:
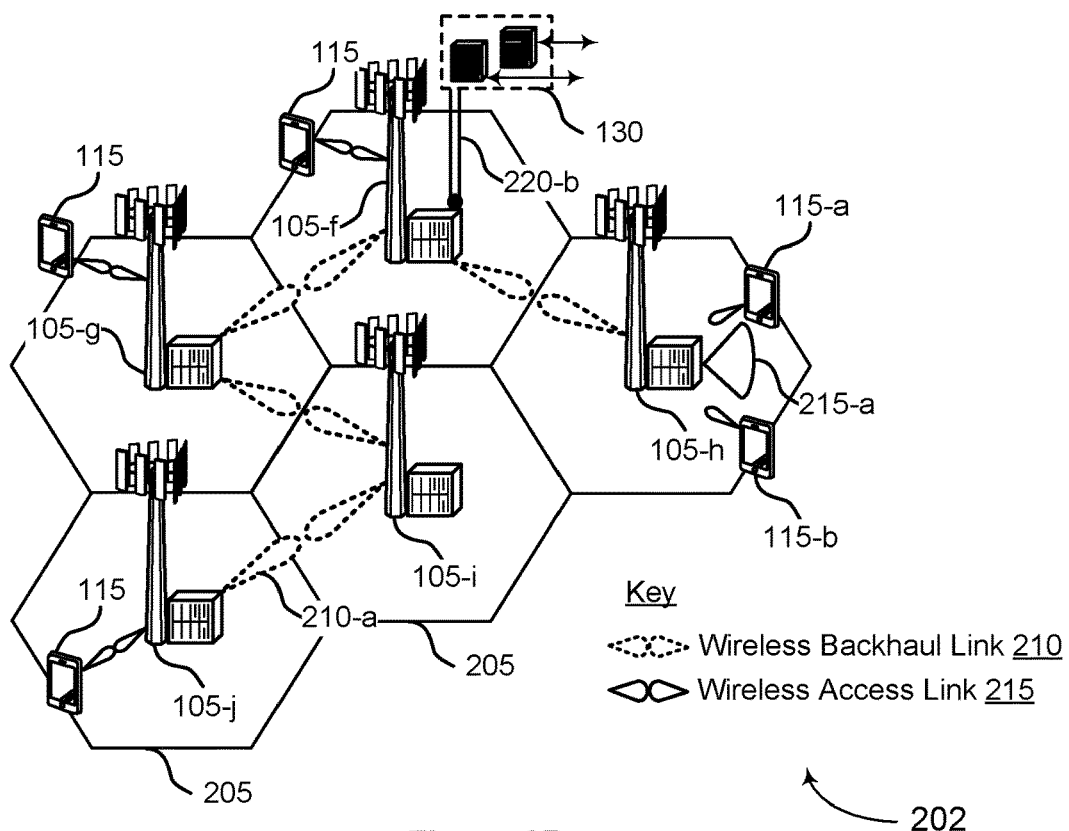

FIG. 2B illustrates an example of a wireless communications system 202 that supports coordination notifications in wireless backhaul systems in accordance with aspects of the present disclosure. In some examples, the wireless communications system 202 may implement aspects of the wireless communications systems 100 or 201. The wireless communications system 202 may support one or more network devices 105 (for example, access nodes) that in turn may support network access for one or more UEs 115 within serving cells 205. One or more of the network devices 105 may be connected to a core network 130 via a wireline backhaul connection 220 (such as backhaul connection 220-b). Infrastructure and spectral resources for network access within the wireless communications system 202 may additionally support one or more wireless backhaul links 210 between the network devices 105. For example, the wireless backhaul links 210 may support an IAB network architecture, with the network devices 105 serving as IAB nodes.

The wireless communications system 202 may implement an IAB architecture by connecting one access node (an IAB "donor" node), such as the network device 105-*f*, to the core network 130 via a fiber point backhaul connection 220-*b*. Other network devices 105 in the wireless communications system 202 (such as a network device 105-*g*, a network device 105-*h*, a network device 105-*i*, or a network device 105-*j*) may propagate access traffic to and from the donor IAB node via the wireless backhaul network using the wireless backhaul links 210 (such as using beamformed wireless backhaul transmissions). Each network device 105 may communicate the access traffic with the one or more UEs 115 served by the particular network device 105 over the access network using the wireless access links 215 (such as using beamformed wireless access transmissions).

In some examples, the network device 105-*f* may be split into associated base station CU and DU entities, in which one or more DU entities ("DUs") may be partially controlled by an associated CU entity ("CU"). The CU entity of the network device 105-*f* may facilitate connection between the core network 130 and the network device 105-*f* (such as via a wireline backhaul connection 220 or, in some examples, a wireless connection to the core network). The DUs of the network device 105-*f* may control or schedule functionality for additional devices (such as for intermediate access nodes that may include, for example, one or more of the network device 105-*g*, the network device 105-*h*, or for the UEs 115) according to the configured wireless backhaul links 210 and the wireless access links 215. Based on the supported entities at the network device 105-*f* (such as the CU entity), the network device 105-*f* may be referred to as an IAB donor.

An intermediate access node (such as the network device 105-*g* and the network device 105-*h*) may support link connectivity with the IAB donor (such as the network device 105-*f*) as part of a relay chain within the IAB network architecture. For example, the network device 105-*g* may be split into associated MT and DU entities, in which the MT functionality of the network device 105-*g* may be controlled or scheduled by the DU entity of the network device 105-*f* The DUs associated with the network device 105-*g* may be controlled by the MT functionality of the network device 105-*g*. In addition, in some examples, one or more DUs of the network device 105-*g* may be partially controlled by signaling messages from the CU entities of associated IAB donor nodes (such as a CU of the network device 105-*f*) of the network connection (such as via an F1-AP). The DU of the network device 105-*g* may support a serving cell 205 of the IAB network coverage area, and may provide for communications with one or more UEs 115 via the access links 215. Based on the supported entities at the network device 105-*g*, the network device 105-*g* may be referred to as an intermediate access node, a relay network device, an IAB node, or a relay node, among other examples.

A network device 105 (such as an intermediate access node) may thus be configured for access network functionality (ANF) and UE functionality (UEF) to allow the network device 105 to act as a scheduling entity and a receiving entity (for example, a scheduled entity). Each of the functionalities may be operated via the one or more backhaul links 210. ANF functionality may enable each network device 105 to operate as a scheduling entity over one or more access links 215 and communicate with one or more UEs 115 located within the IAB network. ANF functionality may further enable each network device 105 to operate as a scheduling entity over one or more coupled backhaul links 210 or to facilitate communication between the one or more other network devices 105 of the IAB network (via the mesh topology).

UEF functionality may enable each network device 105 to operate as a scheduled entity and communicate with one or more other network devices 105 to receive information, such as data. In some examples, a network device 105 may include a routing table for examining a received data packet and forwarding the packet along a path of the IAB network toward the specified IP address of the packet's destination. In some examples, each relay network device 105 (for example, a network device operating as an intermediate access node) may be associated with a single MT function, and may employ backhaul relaying as shown. In some other examples, a relay network device 105 may support multiple MT functions, in which case the relay network devices 105 may be capable of multi-connected cellular backhaul.

As described herein, the wireless communications system 202 may employ one or more wireless access links 215 for establishing mobile access for one or more UEs 115. Each of the network devices 105 and the UEs 115 may be configured to support cellular radio access technologies (RATs), such as mmW-based RATs, for access traffic between the UEs 115 and the network devices 105. Moreover, each of network devices 105 may share resources of the configured RATs for access traffic with backhaul traffic over the network (such as in the case of IAB).

As described with reference to FIG. 2A, the wireless communications system 201 may support methods for coordinating information across multiple hops of an IAB network (such as information regarding data packets or synchronization loss). The wireless communications system 202 may configure a time resource container for transmitting, receiving, amplifying, or forwarding a signal, which may be or include a notification signal, in a full-duplex operating mode. In some examples, the time resource container may occupy one symbol, or a fraction of a symbol (such as ½ or ¼ of a symbol or another subset of a symbol), within a slot associated with IAB communications. The time resource container may be aligned in time for one or more access nodes in the IAB network.

In some examples, the signal may include an indication of coordination information (for example, may be or include a notification signal including an indication of coordination between access nodes) and may be transmitted or received in the time resource container. The signal may be transmitted in a first subset of a set of resources of the time resource container, such that other parts of the time resource container may be used as a gap, during which there may be no signal transmission or reception. In some other examples, the remainder of the time resource container may be used to receive one or more other signals or to transmit one or more other signals. The time resource container may be configured such that coordination information (such as information transmitted via a notification signal) may be received by one or more access nodes of the IAB network within the time resource container.

In some examples, access nodes (such as network devices 105 or UEs 115) within an IAB network may use beamforming to transmit (forward) or receive a signal (for example, if communicating using mmW signals to transmit a notification signal). An access node may determine a beam width for forwarding or transmitting the signal based on a number of child or parent access nodes to which the access node may be configured to transmit the signal. Similarly, the access node may determine a beam width for receiving the signal based on a number of child or parent nodes from which the access node may receive the signal. For example, a network device 105-*j* may use a narrow beam (such as backhaul link 210-*a*) for transmitting a signal to a network device 105-*i* in the uplink direction or for receiving a signal from the network device 105-*i* in the downlink direction because the network device 105-*i* may be a single parent node to the network device 105-*j*. In a second example, a network device 105-*h* may use a broader beam (such as access link 215-*a*) for transmitting a signal to UEs 115-*a* and 115-*b* in the downlink direction or for receiving a signal from UEs 115-*a* or 115-*b* in the uplink direction because the network device 105-*j* may be associated with the UE 115-*a* and the UE 115-*b* as a parent node. Similarly, the UE 115-*a* and the UE 115-*b* may both use narrow beams for communicating with the network device 105-*h*.

In some examples, the network or the CU of the network device 105-*f* may determine a configuration for the time resource container. In other examples, the time resource container may be configured based on a defined configuration (such as corresponding to a wireless network standard) that may be stored at one or more access nodes or each access node of the network. The CU of the network device 105-*f* may transmit an indication of the configuration of the time resource container to other access nodes of the network, or the other access nodes of the network may be preconfigured with the time resource container configuration. An access node may receive a signal in the time resource container, and forward (and in some examples, amplify prior to forwarding) the signal (for example, the received signal or a signal based on the received signal, which may be an example of a notification signal) to one or more parent or child access nodes while operating in a full-duplex operating mode. For example, if the signal is directed in the uplink direction, an access node may receive the signal and amplify and forward the signal to one or more parent access nodes. Similarly, if the signal is directed in the downlink direction, the access node may receive the signal and amplify and forward the signal to one or more child access nodes. As described herein, in some examples, the forwarded signal may include a notification signal, and in some examples, may include noise.

After forwarding the signal to one or more corresponding child nodes or parent access nodes, an access node may decode the signal to determine whether the signal includes coordination information that applies to the access node (or in some examples to one or more other access nodes). In some examples, such information may include one or more of an on-off flag, an access node ID, a notification type indicating the cause of a notification signal, one or more actions to be taken by an identified access node, or a time corresponding to the one or more actions. If the signal includes a notification signal having coordination information that applies to the access node, the access node may perform one or more actions associated with the notification signal or indicated within the notification signal.

Figure 3A:
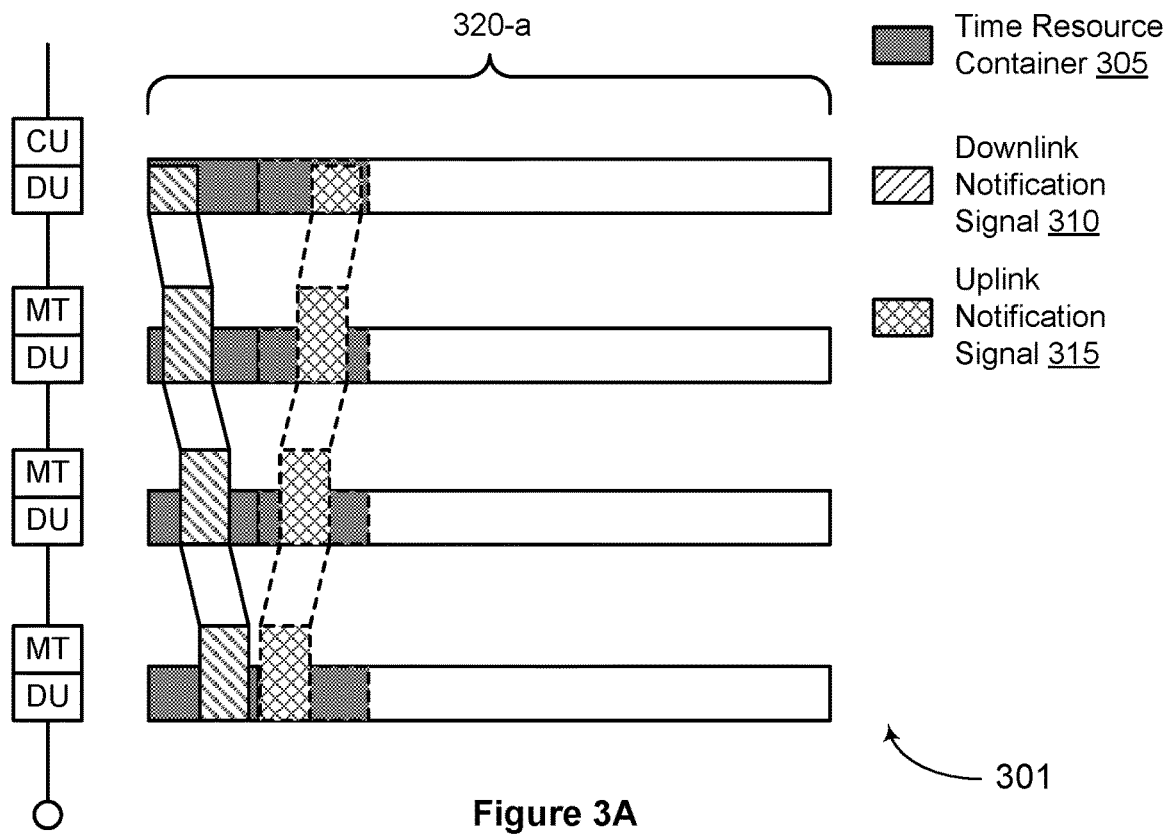
FIGS. 3A and 3B illustrate examples of signaling configurations that support coordination notifications in wireless backhaul systems in accordance with aspects of the present disclosure.
Figure 3B:
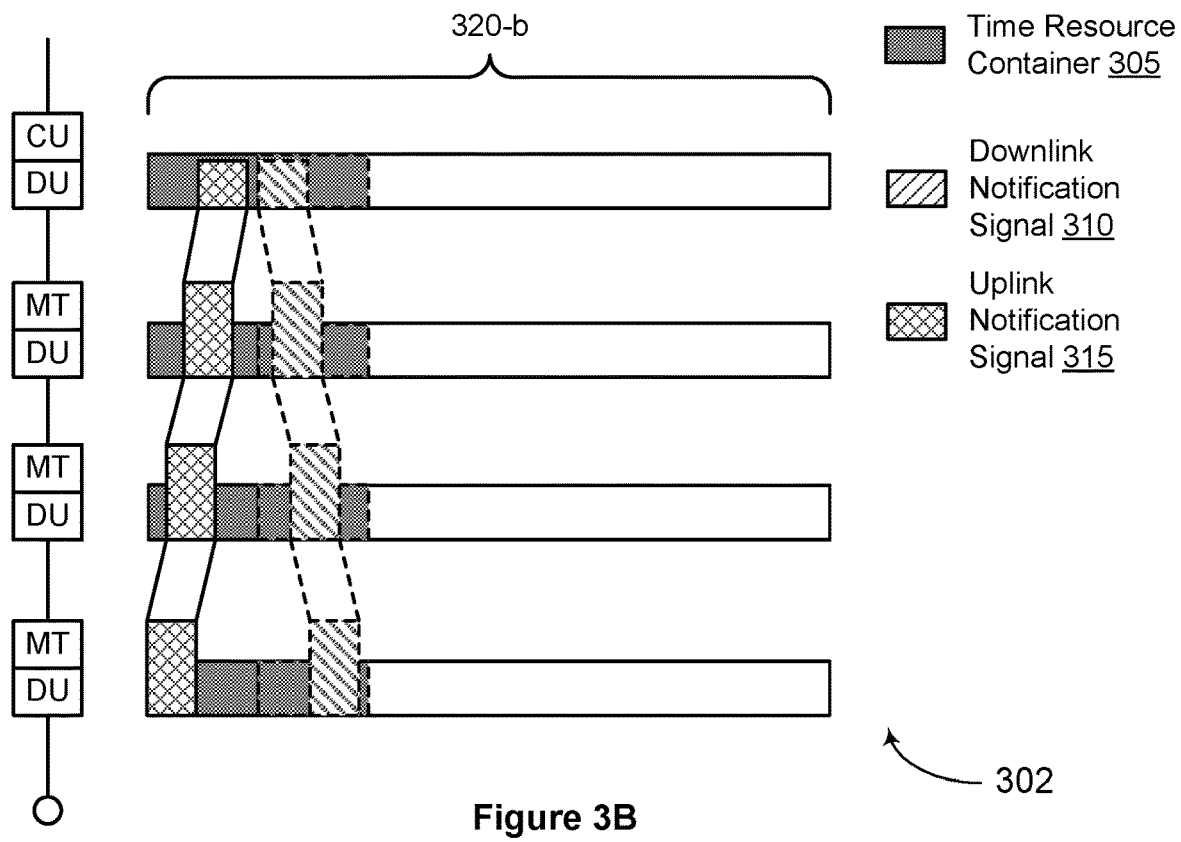

FIGS. 3A and 3B illustrate examples of a signaling configuration 301 and a signaling configuration 302 that support coordination notifications in wireless backhaul systems in accordance with aspects of the present disclosure. In some examples, the signaling configurations 301 and 302 may be implemented by aspects of the wireless communications systems 100, 201, or 202. For example, the signaling configurations 301 or 302 may be used by access nodes of a wireless network (such as an IAB network) to transmit and receive a notification signal. In some examples, the access nodes may represent UEs 115, network devices 105, or other devices within a wireless network.

The signaling configurations 301 or 302 may include one or more time resource containers 305, which may be configured within at least a subset of a slot 320. A time resource container 305 may include one symbol or a fraction of a symbol, in some examples, as described with reference to FIG. 2B, and may be aligned in time for one or more access nodes of an IAB network. The time resource container 305 may be used to transmit a notification signal to facilitate coordination between one or more access nodes. In some examples, the notification signal may occupy a first subset of the time resource container and a second subset of the time resource container may account for propagation latency across multiple hops in the IAB network, as illustrated in FIG. 3A and FIG. 3B. An access node may receive a signal in a configured time resource container (such as a downlink notification signal 310 or an uplink notification signal 315) and may amplify and forward the signal (for example, the received signal or another signal based on the received signal) to one or more associated nodes. For example, the access node may forward the signal to one or more associated child nodes if the signal is a downlink notification signal 310 or may forward the signal to one or more associated parent nodes if the signal is an uplink notification signal 315. In some examples, the forwarded signal may include a notification signal, and in some examples, may include noise.

The access node may store the received signal and decode the signal to determine whether the signal includes a coordination notification (for example, to determine whether the signal is a notification signal). If the signal includes a coordination notification for the access node or one or more other access nodes of interest, the access node may verify whether the coordination notification is intended for the access node or the one or more other access nodes of interest. In some examples, the access node may store the signal via down conversion, decoding, or using an analog to digital converter (ADC), for further processing.

In a first example illustrated in FIG. 3A, a first time resource container 305 may be configured for downlink signals (such as a downlink notification signal 310). For example, a DU of a donor access node may transmit a downlink notification signal 310 to a child access node (for example, to an MT of a child access node) at a beginning of the time resource container 305. After a propagation delay, the child access node may receive the downlink notification signal 310 and may amplify and forward the downlink notification signal 310 to one or more child access nodes while receiving the downlink notification signal 310 (for example, may forward the signal via a DU). After a propagation delay, the one or more child access nodes may receive the downlink notification signal 310 and may perform a similar amplifying and forwarding process to one or more additional child access nodes. The receiving, amplifying, and forwarding (while operating in a full-duplex operating mode) may continue until a last child access node receives the downlink notification signal 310.

The time resource container 305 may be configured such that the last child access node receives the downlink notification signal 310 within a same time resource container 305 that is associated with the first transmission of the downlink notification signal 310. In some examples, the network may configure, or one or more access nodes may be preconfigured with, parameters for the time resource container such that with signal time and propagation delays in the network, the downlink notification signal 310 may be received by the last child access node within the time resource container 305. For example, a duration of the time resource container 305 may be greater than or equal to the sum of the duration of the downlink notification signal 310 and the duration of the propagation latency between two or more of the access nodes of the network (such as a propagation latency between two or more access nodes or between all of the access nodes in a route within the network, among other examples).

A second time resource container 305, in some examples, may be configured for uplink signals (such as an uplink notification signal 315). For example, an MT of a donor access node may transmit an uplink notification signal 315 to a parent access node (for example, to a DU of a parent access node) at a beginning of the time resource container 305. After a propagation delay, the parent access node may receive the uplink notification signal 315 and may amplify and forward the uplink notification signal 315 to one or more parent access nodes while receiving the uplink notification signal 315 (for example, the access node may forward the signal via an MT). After a propagation delay, the one or more parent access nodes may receive the uplink notification signal 315 and may perform a similar amplifying and forwarding process to one or more additional parent access nodes. The receiving, amplifying, and forwarding (while operating in a full-duplex operating mode) may continue until a last parent access node (such as a donor access node) receives the uplink notification signal 315.

In a second example illustrated in FIG. 3B, a time resource container 305 may be configured for uplink signals (such as an uplink notification signal 315). For example, an MT of a child access node (such as a last child access node or another originating child access node) may transmit an uplink notification signal 315 to a parent access node (for example, to a DU of the parent access node) at a beginning of the time resource container 305. After a propagation delay, the parent access node may receive the uplink notification signal 315 and may amplify and forward the uplink notification signal 315 to one or more parent access nodes while receiving the uplink notification signal 315 (for example, may forward the signal via an MT). After a propagation delay, the one or more parent access nodes may receive the uplink notification signal 315 and may perform a similar amplifying and forwarding process to one or more additional parent access nodes. The receiving, amplifying, and forwarding may continue until a last parent access node receives the uplink notification signal 315.

The time resource container 305 may be configured such that the last parent access node (such as a donor access node or another end access node different than the donor access node) receives the uplink notification signal 315 within a same time resource container 305 as associated with the first transmission of the uplink notification signal 315. In some examples, the network may configure, or one or more access nodes may be preconfigured to include, the time resource container 305 such that with signal time and propagation delays, the uplink notification signal 315 may be received by the last parent access node within the time resource container 305. For example, the duration of the time resource container 305 may be greater than or equal to the sum of the duration of the uplink notification signal 315 and the duration of the propagation latency between two or more of the access nodes of the network (such as a propagation latency between two or more access nodes or between all of the access nodes in a route within the network, among other examples).

As illustrated in FIG. 3B, in some examples, a second time resource container 305 may be configured for downlink signals, which may be configured in a similar manner as the corresponding time resource container 305 described with respect to FIG. 3A, among other sections.

In some examples, the network may configure, or one or more access nodes may be preconfigured to include, multiple time resource containers 305 at any location within a slot 320. In the example illustrated by the dashed lines in FIG. 3A or 3B, additional time resource containers 305 may be configured within a slot 320-a or 320-b, respectively. A time resource container may be configured for uplink signals, for downlink signals, or both. In some examples, an uplink notification signal 315 (for example, initiated by a child access node of a parent access node) may be originated in response to a downlink notification signal 310, or vice versa.

In some examples in which a time resource container 305 spans a symbol, the symbol may be split into multiple sub-symbols (for example, using a higher density tone spacing). In some examples, one of the sub-symbols may be used as a time resource container 305 for downlink notification signals 310 (such as downlink coordination notification signals), one of the sub-symbols may be used as a time resource container 305 for uplink notification signals 315 (such as uplink coordination notification signals), or one or more remaining sub-symbols may be used for other communications associated with one or more other physical channels (such as a physical downlink control channel (PDCCH) or a physical downlink shared channel (PDSCH)). In some examples, a network, a slot 320, or a time resource container 305 may be configured with downlink notification signals, uplink notification signals, or both. A notification signal indicating coordination information may, in some examples, be an on-off signal, such that no notification signal (for example, the absence of a notification signal or transmission of a notification signal) may indicate an absence of a coordination notification, and an access node may be configured to operate using a default action.

A notification signal may include one or more of an on-off flag, a node association ID, a notification type, one or more actions to perform (such as specified actions), or an action time associated with the one or more actions. Additionally or alternatively, a notification signal may include a delay-critical message or data packet (such as a URLLC packet). In some examples, the notification type of the notification signal may indicate that the notification signal includes the delay-critical message or packet. The on-off flag may indicate whether the signal corresponds to a coordination notification or is a notification signal.

The node association ID may indicate one or more associated access nodes for which the notification signal is intended. For example, an access node may be configured with a quantity of node association IDs and if the ID of the notification signal matches one of the configured IDs for the access node, the notification signal may be intended for the access node. In some examples, a node association ID may correspond to a route ID within the IAB network, and a set of access nodes associated with the route ID may correspond to a set of access nodes along a route within the IAB network.

The notification type of the notification signal may indicate a cause of the notification signal, such as an incoming URLLC packet or a synchronization loss, among other examples. The one or more actions indicated by the notification signal may include one or more actions to be taken by an associated access node upon decoding the notification signal. In some examples, the action time may further indicate a time after a reception of the notification signal or a detection of the notification, among other triggers, to perform the one or more actions.

In some examples of a specified action, upon notification of an incoming URLLC packet, an access node may override one or more communications resources (such as resources of one or more resource types) to prioritize reception and transmission of a URLLC packet. In some other examples of a specified action, upon notification of an incoming URLLC packet, an access node may activate additional PDCCH resources within a slot 320 to receive downlink control information (DCI) associated with the URLLC packet. In some other examples of a specified action, upon notification of synchronization loss for a first access node within the IAB network, a second access node may be activated to function as a stand-by access node (for example, a parent node that may stand in the place of the first access node).

An access node may verify that a received coordination notification in the notification signal is intended for the access node based on decoding the notification signal. For example, the access node may use the node association ID carried by the notification signal to verify that the notification signal is intended for the access node, or may use other information to verify that the notification signal is intended for the access node (such as one or more physical characteristics of the notification signal, which may include an energy level, a time or frequency location, or a duration, among other examples). If the access node determines that the information in the notification signal is irrelevant for the access node, the access node may discard the received notification signal. For example, an ID in the received signal may not match an ID associated with the access node, or the access node may determine that the signal includes noise above a defined threshold. In some examples, after decoding the notification signal the access node may take actions configured by the IAB network (such as the specified actions described herein) or one or more actions preconfigured for the access node, the actions being based on decoding the notification signal and verifying that the coordination information is relevant to the access node.

An access node may employ one or more methods for amplifying and forwarding a signal within the time resource container 305. In some examples, an access node may amplify and forward a received signal within the time resource container 305 without further processing (for example, forwarding "blindly"), or regardless of whether the notification signal is on or off (for example, regardless of whether the received signal includes a coordination notification signal). In some examples, the access node may conditionally amplify and forward the signal based on processing performed on the received signal (such as energy detection). For example, the access node may measure a received power (for example, using a receiver power detector) associated with the signal and may cease amplifying and forwarding the signal if the measured power of a first segment or a subset of the signal is below a defined threshold. In some examples, amplifying and forwarding the signal may be based on a capability of an access node, such that the access node may blindly amplify and forward or conditionally amplify and forward the signal based on the capability of the access node. In some examples, an on-off flag may indicate a notification scheme including one or more of the methods for amplifying and forwarding the signal (for example, blindly or based on one or more conditions, as described herein).

An access node may amplify and forward the signal for at least a duration occupied by the signal, the duration being less than or equal to a duration of the time resource container 305 less a propagation latency between remaining access nodes (such as a propagation latency between one or more access nodes of the network). As such, the signal may be received by a last access node before an end of the time resource container and may avoid interfering with transmissions to or from the last access node (such as transmissions in a next symbol, which may in some examples, be in another time resource container or may not be associated with a time resource container). As described with reference to FIG. 2B, an access node may receive or forward the signal using a beam (such as a broad or narrow beam) based on a number of parent or child access nodes associated with transmitting or receiving the signal, respectively.

A time resource container 305 may be associated with one or more configurations with respect to transmissions for other physical channels in the IAB network (such as transmissions between access nodes of the network). Such configurations may be implemented by an IAB network (such as by a CU of the network), may be implemented by an access node of the network, or may be specified by a wireless communications standard.

In some examples, a time resource container 305 may be overlaid with one or more other physical signals or channels (for example, to increase resource utilization) in time. For example, the one or more other physical signals or channels may overlap with the time resource container 305 (in some examples overlapping with associated coordination notification signals) in time, but may be separated from notification signals of a time resource container 305 in a frequency or a code domain, among other examples.

In some examples of downlink overlapping, the time resource container 305 may be configured for a downlink notification signal 310 and may be overlaid with one or more downlink signals or channels (such as a PDCCH, PDSCH, synchronization signal block (SSB), or channel state information reference signal (CSI-RS)), which may be transmitted by an access node DU. In some examples of uplink overlapping, the time resource container 305 may be configured for an uplink notification signal 315 and may be overlaid with one or more uplink signals or channels (such as a physical uplink control channel (PUCCH), physical uplink shared channel (PUSCH), or physical random access channel (PRACH)), which may be transmitted by an access node MT. In either the uplink direction or the downlink direction, the access node (for example, the access node DU or MT) may amplify and forward a received signal, such as a notification signal, to a child or a parent access node, while concurrently transmitting one or more other generated uplink or downlink signals or channels to the child or parent access node.

The examples and techniques described herein may be used to support a network (such as an IAB network) in such a way to communicate coordination information between access nodes and reduce delays for such communications. For example, a notification signal for coordination may be received by one or more access nodes of a network within a duration of one symbol or less. Such timing may decrease overall latency and may support increased coordination in wireless networks (which may be or include IAB networks).

Figure 4:
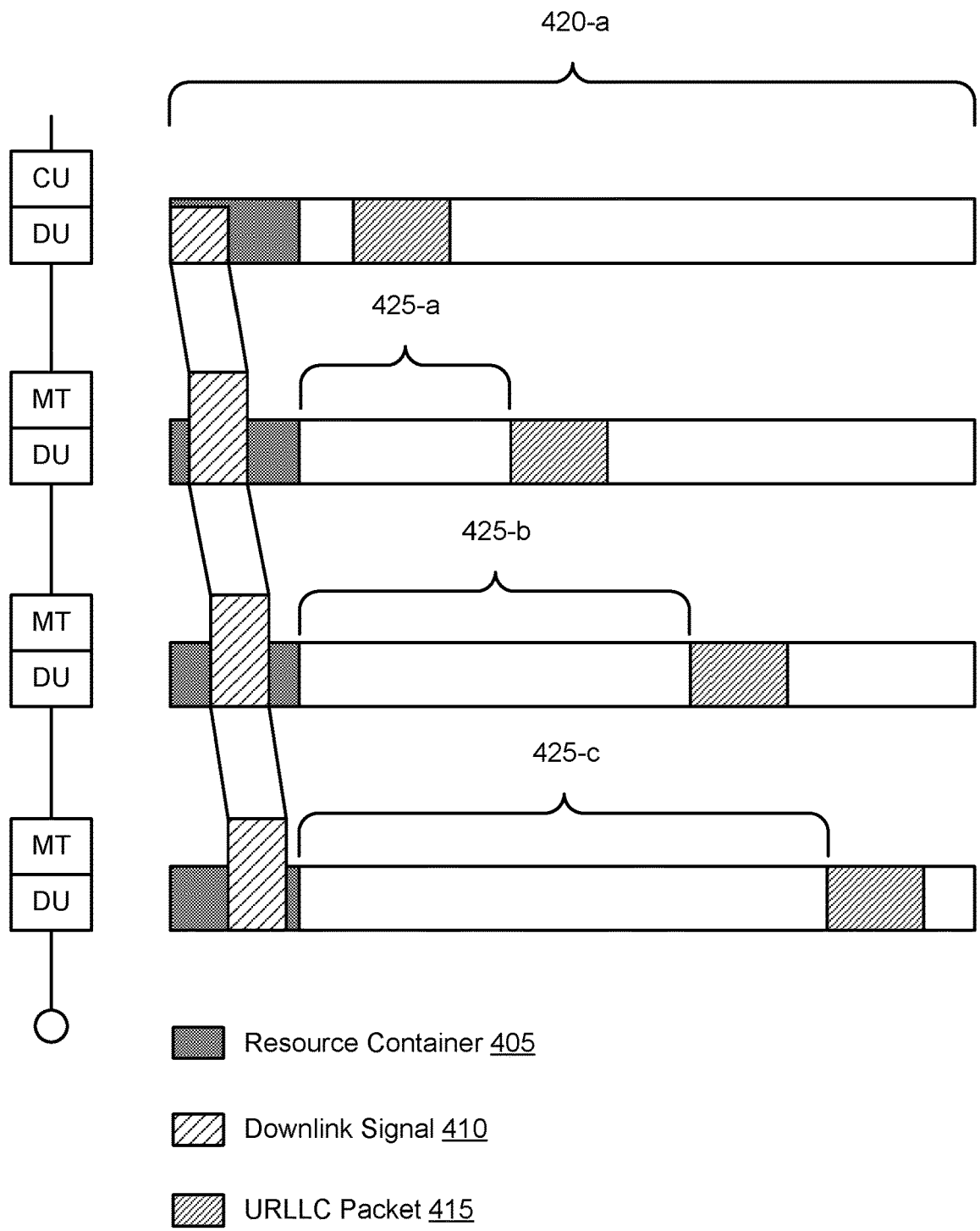
FIG. 4 illustrates an example of a signaling configuration that supports coordination notifications in wireless backhaul systems in accordance with aspects of the present disclosure.

FIG. 4 illustrates an example of a signaling configuration 400 that supports coordination notifications in wireless backhaul systems in accordance with aspects of the present disclosure. In some examples, the signaling configuration 400 may be implemented by aspects of the wireless communications systems 100, 201, or 202, as well as aspects of the signaling configurations 301 or 302. For example, the signaling configuration 400 may be used by access nodes of a wireless network (such as an IAB network) to transmit and receive a notification signal for coordination. In some examples, the access nodes may represent UEs 115, network devices 105, or other devices within a wireless network, such as an IAB network.

The signaling configuration 400 illustrates time resource containers 405, which may be configured within a slot 420. A time resource container 405 may be used to transmit a signal (such as a notification signal), as described with reference to FIGS. 2A-3B, among other sections. An access node may receive a signal (which may or may not be or include a notification signal) in a configured time resource container 405 (such as in a downlink signal 410) and may amplify and forward the signal to one or more associated parent or child nodes while operating in a full-duplex operating mode.

In some examples, a downlink signal 410 may include a notification signal that may indicate a reason for the notification and one or more specified actions to be taken by one or more access nodes upon decoding the notification signal. For example, the notification signal may be configured to notify one or more access nodes of an incoming URLLC packet 415. An access node may be configured to determine one or more actions associated with the notification signal. The one or more actions may be associated with the notification signal via a defined or stored configuration, or may be included in the notification signal. In some examples associated with FIG. 4, upon decoding an indication of an incoming URLLC packet 415 in the notification signal, an access node may determine a corresponding action, such as overriding one or more resource types (such as semi-statically configured resources or previously configured resources) for reception and transmission of the URLLC packet 415.

In some examples, access nodes of an IAB network may be serving other child nodes or other communications types if a CU of the network receives a URLLC packet 415 for transmission in a slot 420-a. The CU may transmit a downlink signal 410 including a notification signal within the time resource container 405 to corresponding child nodes, the notification signal indicating the incoming URLLC packet 415. The child access nodes may receive, amplify, and forward the downlink signal 410 to their respective child access nodes, and so on until at least some of the access nodes or each access node in the network has received the downlink signal 410. Upon receiving the downlink signal 410, each access node may decode the downlink signal 410 and verify whether the notification signal is intended for the respective access node. In the example illustrated in FIG. 4, each of the shown access nodes may verify that the notification signal is intended for them, because the URLLC packet 415 may be transmitted along a route including the access nodes.

Accordingly, one or more access nodes may determine one or more actions corresponding to the notification associated with the notification signal and may perform the one or more actions. For example, one or more access nodes along the path of the URLLC packet 415 may override expected behavior or transmissions for at least a subset of the slot 420-a. In some examples, if the one or more access nodes were previously configured to transmit (such as via a DU of the access node) over slot 420-a, the access nodes may switch a priority from signal transmission to signal reception (such as via an MT of the access node). In some examples, the access nodes may provide priority to signal reception (such as in a reception priority window 425-a, 425-b, or 425-c) until receiving the URLLC packet 415, while in alternative some examples, the access nodes may give priority to signal reception at a specified reception time associated with receiving the URLLC packet 415 (for example, based on timing information included in the coordination notification), but may otherwise engage in other actions over slot 420-a.

A donor access node (for example, associated with the CU) may transmit the URLLC packet 415 to a corresponding child access node, and the child access node may receive the URLLC packet 415 based on giving priority to signal reception. The child access node may relay the URLLC packet 415 to a following child access node, which may receive the URLLC packet 415 based on giving priority to signal reception, and which may further relay the URLLC packet 415. The process of receiving and relaying the URLLC packet 415 (based on giving priority to signal reception) may continue until the URLLC packet 415 has reached a destination access node, for example, over the slot 420-a.

Figure 5:
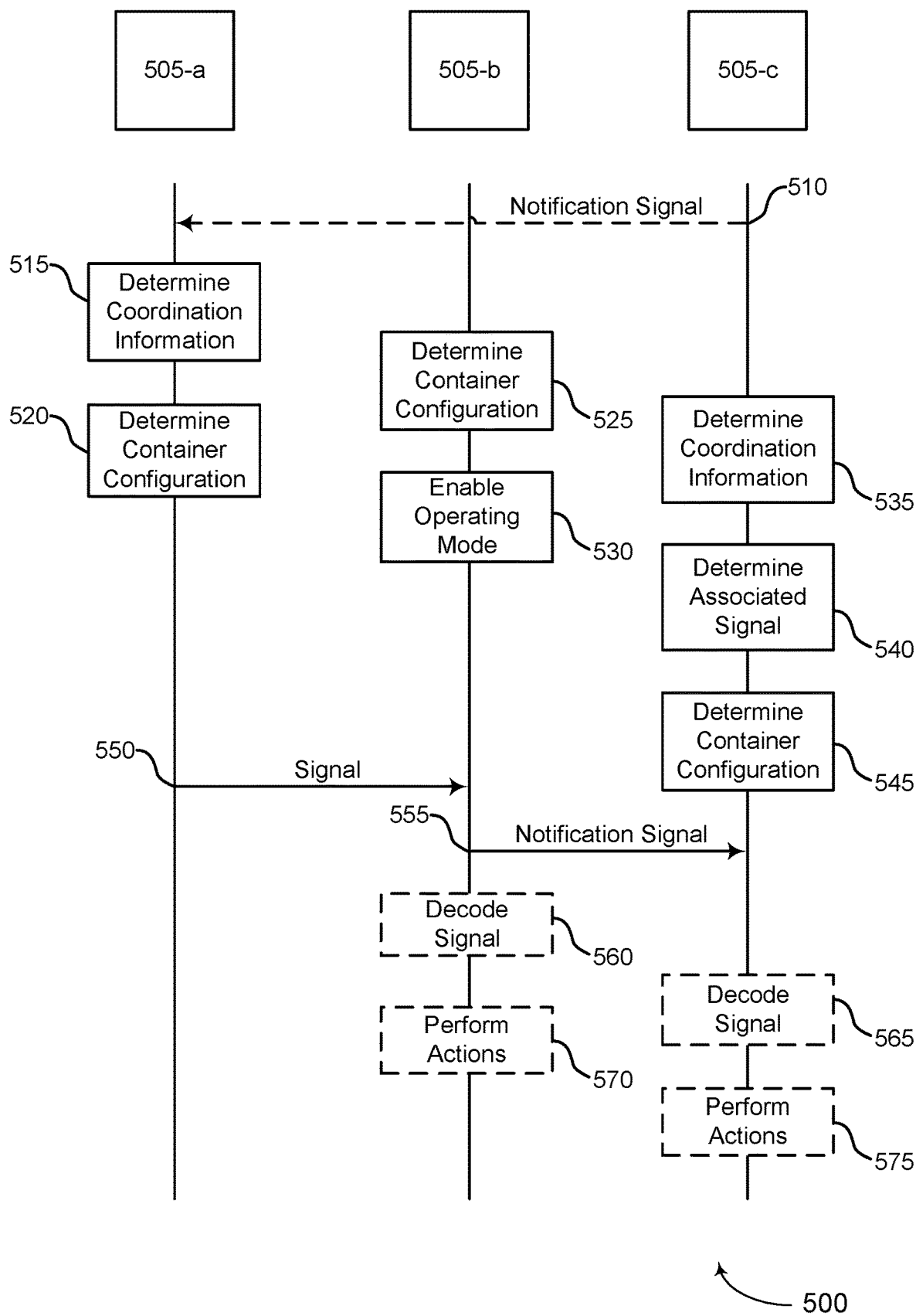
FIG. 5 illustrates an example of a process flow that supports coordination notifications in wireless backhaul systems in accordance with aspects of the present disclosure.

FIG. 5 illustrates an example of a process flow 500 that supports coordination notifications in wireless backhaul systems in accordance with aspects of the present disclosure. In some examples, the process flow 500 may be implemented by, or relate to, aspects of wireless communications systems 100, 201, or 202. Process flow 500 may also implement aspects of one or more of the signaling configurations 301, 302, 400. The process flow 500 may be implemented by one or more of access nodes 505-a, 505-b or 505-b, which may be examples of access nodes described with reference to FIGS. 1-4 (such as access nodes included in an IAB network). In some examples, the access nodes 505 may represent one or more UEs 115, one or more network devices 105, or one or more other devices within a wireless network. The process flow 500 may be implemented by one or more access nodes to transmit and receive a notification signal using a time resource container, as described with reference to FIGS. 2A-4.

In the following description of the process flow 500, the operations between the access nodes 505 may be transmitted in a different order than the order shown, or the operations performed by the access nodes 505 may be performed in different orders or at different times. Specific operations may also be left out of the process flow 500, or other operations may be added to the process flow 500. Although the access nodes 505-a, 505-b, or 505-c are shown performing the operations of process flow 500, some aspects of some operations may also be performed by one or more other wireless devices.

The signals transmitted between the access nodes 505 in process flow 500 may represent downlink or uplink signals. For example, if transmitting in the downlink direction, the access node 505-a may represent a donor access node 505, the access node 505-b may represent an intermediate access node 505 (such as an access node 505 that functions as a child and a parent access node 505), and the access node 505-c may represent a child access node 505 or an intermediate access node. In an example of transmitting in the uplink direction, the access node 505-c may represent a donor access node 505, the access node 505-b may represent an intermediate access node 505 (such as an access node 505 that functions as a child and a parent access node 505), and the access node 505-a may represent a child access node 505 or an intermediate access node.

In some examples, the access node 505-a may represent a donor access node 505, a child access node 505, or an intermediate access node 505 (such as an access node 505 that functions as a child and a parent access node 505). In some examples, the access node 505-b may represent an intermediate access node 505 (such as an access node 505 that functions as a child and a parent access node 505). In some examples, the access node 505-c may represent a child access node 505, a donor access node 505, or an intermediate access node 505. While the process illustrated herein includes three access nodes 505, the process may be generalized to be performed by any number of access nodes 505.

At 510, in some examples, the access node 505-c may transmit a notification signal to one or both of the access nodes 505-a and 505-b. For example, the access node 505-c may transmit a notification signal in the downlink direction that may request notification that an action associated with the notification signal has been completed. As described with reference to 550 and 555, one or both of the access nodes 505-a and 505-b may transmit a notification signal (such as a responsive uplink notification signal) to the access node 505-c indicating that the action has been completed. For example, the access node 505-c may receive a notification signal from one or both of the access nodes 505-a and 505-b in response to the transmitted coordination notification signal.

At 515, the access node 505-a may determine coordination information associated with one or more access nodes 505 of a network (such as one or more of access nodes 505-a, 505-b, or 505-c). For example, the coordination information may include a notification of an incoming data packet (such as a URLLC packet) or a notification of synchronization loss (for example, synchronization loss at the access node 505-a or an associated child or parent access node 505), among other examples.

At 520, the access node 505-a may determine a configuration of a time resource container for communicating an indication of the coordination information associated with one or more of the access nodes 505, the time resource container including a set of time resources. In some examples, the access node 505-a may be a donor access node, and the access node 505-c may configure the time resource container. In some examples, the time resource container may include one symbol or a fraction of a symbol of a slot and may be configured based on a network configuration or a wireless communications standard. The time resource container may be aligned in time with similar time resource containers configured for one or more other access nodes 505-b and 505-c.

At 525, the access node 505-b may determine a configuration of a time resource container for communicating an indication of coordination information associated with the access nodes 505 of the network, the time resource container including a set of time resources. As described herein, the time resource container may include one symbol or a fraction of a symbol of a slot and may be configured based on a network configuration or a wireless communications standard. In some examples, a donor access node 505 (such as the access node 505-a or 505-c) may transmit an indication of the time resource container configuration to the access node 505-b. In some other examples, the access node 505-b may determine the time resource container configuration without first receiving any indication of a time resource container configuration. In some examples, the determination may be based on a frequency band used for network communications, a location of the access node within the network, or a slot structure, among other examples. As described herein, the time resource container may be aligned in time with similar time resource containers configured for the access nodes 505-a and 505-c.

At 530, the access node 505-b may enable an operating mode based on determining the configuration of the time resource container. In some examples, the access node 505-b may enable the operating mode for at least a duration of the time resource container. In the operating mode, the access node 505-b may receive a signal, and concurrently (for example, at least partially overlapping) forward the received signal to another access node 505 (such as the access node 505-c), which may be referred to as amplifying and forwarding the signal.

At 535, the access node 505-c may determine coordination information associated with the access nodes 505 of the network (such as access nodes 505-a, 505-b, and 505-c). For example, the coordination information may include a notification of an incoming data packet (such as a URLLC packet) or a notification of synchronization loss (for example, synchronization loss at the access node 505-c or an associated child or parent access node 505).

At 540, the access node 505-c may determine that the coordination information is associated with an incoming signal, such as a notification signal, as described with reference to 555.

At 545, the access node 505-c may determine a configuration of a time resource container for communicating an indication of the coordination information associated with the access nodes 505, the time resource container including a set of time resources. In some examples, the access node 505-c may be a donor access node, and the access node 505-c may configure the time resource container. The time resource container may be aligned in time with other time resource containers configured for access nodes 505-a and 505-b and may be configured in one or more of the manners described herein.

At 550, the access node 505-a may transmit a signal (which may be a notification signal or may be another signal different than a notification signal) to the access node 505-b in a first subset of the set of time resources of the time resource container based on the configuration of the time resource container. In some examples, the signal may include the indication of the coordination information. For example, the access node 505-a may transmit the signal to the access node 505-b in the time resource container. In some examples, the signal may include a notification signal and the signal may span a first subset of the time resource container (for example, a subset that is less than a time resource container duration less a propagation latency) to reach both of the access nodes 505-b and 505-c. The access node 505-b may receive the signal in the operating mode and within the first subset.

At 555, the access node 505-b may amplify and forward, in the time resource container and while operating in the operating mode, the signal to the access node 505-c. The signal may include a notification signal that includes the indication of the coordination information. In some examples, the notification signal may be based on the signal received from the access node 505-a and may be the same signal or may at least include some of the information in the signal received at 540. For example, the notification signal may include one or more of an on-off flag, a node association ID, a notification type, one or more actions to perform (such as specified actions), or an action time associated with the one or more actions. The access node 505-b may amplify and forward the signal using one or more of the techniques described herein (for example, with reference to FIG. 3A or FIG. 3B). The access node 505-c may receive the amplified and forwarded signal from the access node 505-b.

At 560, the access node 505-*b* may decode the signal after amplifying and forwarding the signal to the access node 505-*c*. In some examples, the access node 505-*b* may store the signal before amplifying and forwarding the signal but decode the signal after amplifying and forwarding the signal. In some other examples, the access node 505-*b* may store and decode the signal after amplifying and forwarding the signal. As described with reference to FIGS. 3 and 4, decoding the signal may be followed by, or may include, determining whether the signal is intended for the access node 505-*b* or one or more other access nodes. If the signal is intended for the access node 505-*b*, the access node 505-*b* may perform one or more actions associated with the signal. At 565, the access node 505-*c* may store and decode the signal in a similar manner.

At 570, the access node 505-*b* may perform one or more actions associated with the signal (for example, if the signal is intended for the access node 505-*b* and is a notification signal). As described with reference to FIGS. 3A, 3B, and 4, the one or more actions may include: overriding one or more communications resources (such as one or more resource types) for reception and transmission of a URLLC packet, activating additional PDCCH resources within a slot to receive DCI associated with a URLLC packet, or activating a third access node 505 to function as a stand-by parent node, among other examples. At 575, the access node 505-*c* may perform one or more actions in a similar manner (for example, if the notification signal is intended for the access node 505-*c*). In this manner, more efficient and effective communications related to notification signals with reduced propagation delay may be achieved, among other benefits.

Figure 6:
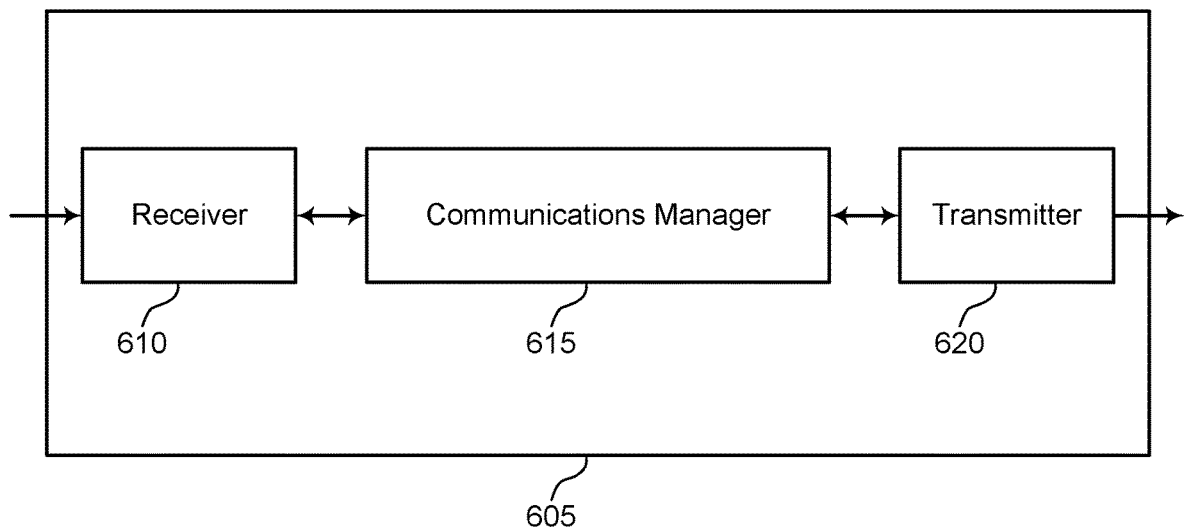
FIGS. 6 and 7 show block diagrams of devices that support coordination notifications in wireless backhaul systems in accordance with aspects of the present disclosure.

FIG. 6 shows a block diagram of a device 605 that supports coordination notifications in wireless backhaul systems in accordance with aspects of the present disclosure. The device 605 may be an example of aspects of a network device 105, a UE 115, or another wireless device. The device 605 may include a receiver 610, a communications manager 615, and a transmitter 620. The communications manager 615 may be implemented, at least in part, by one or both of a modem and a processor. Each of these components may be in communication with one another (for example, via one or more buses).

The receiver 610 may receive information such as packets, user data, or control information associated with various information channels (for example, control channels, data channels, and information related to coordination notifications in wireless backhaul systems). Information may be passed on to other components of the device 605. The receiver 610 may be an example of aspects of the transceiver 920 described with reference to FIG. 9. The receiver 610 may utilize a single antenna or a set of antennas.

The communications manager 615 may determine a configuration of a time resource container for communicating an indication of coordination information associated with access nodes of a network, the time resource container including a set of time resources; enable an operating mode for amplifying and forwarding a signal based one determining the configuration of the time resource container; receive, from a second access node of the access nodes and while in the operating mode, a signal in a first subset of the set of time resources of the time resource container; and amplify and forward, in the time resource container and while in the operating mode, the signal to a third access node of the access nodes, the forwarded signal including a notification signal including the indication of the coordination information.

The communications manager 615 may also determine coordination information associated with access nodes of a network; determine a configuration of a time resource container for communicating an indication of the coordination information associated with the access nodes, the time resource container including a set of time resources; and communicate, with a second access node of the access nodes and based on the configuration of the time resource container, a notification signal in a first subset of the set of time resources of the time resource container, in which the notification signal includes the indication of the coordination information.

The transmitter 620 may transmit signals generated by other components of the device 605. In some examples, the transmitter 620 may be collocated with a receiver 610 in a transceiver component. For example, the transmitter 620 may be an example of aspects of the transceiver 920 described with reference to FIG. 9. The transmitter 620 may utilize a single antenna or a set of antennas.

The actions performed by the communications manager 615 may be implemented to realize one or more potential advantages. For example, communications manager 615 may increase communication reliability and decrease communication latency at a wireless device (such as a UE 115 or a network device 105) by enabling coordination notification signals with a reduced latency. The coordination notification signals may reduce transmission delays, improve communication accuracy, and reduce overhead compared to other systems and techniques, for example, that decode a signal and then transmit the signal, which may increase propagation delay. Similarly, communications manager 615 may save power and increase battery life at a wireless device (such as a UE 115) by strategically reducing overhead and decreasing coordination notification timing, among other advantages.

Figure 7:
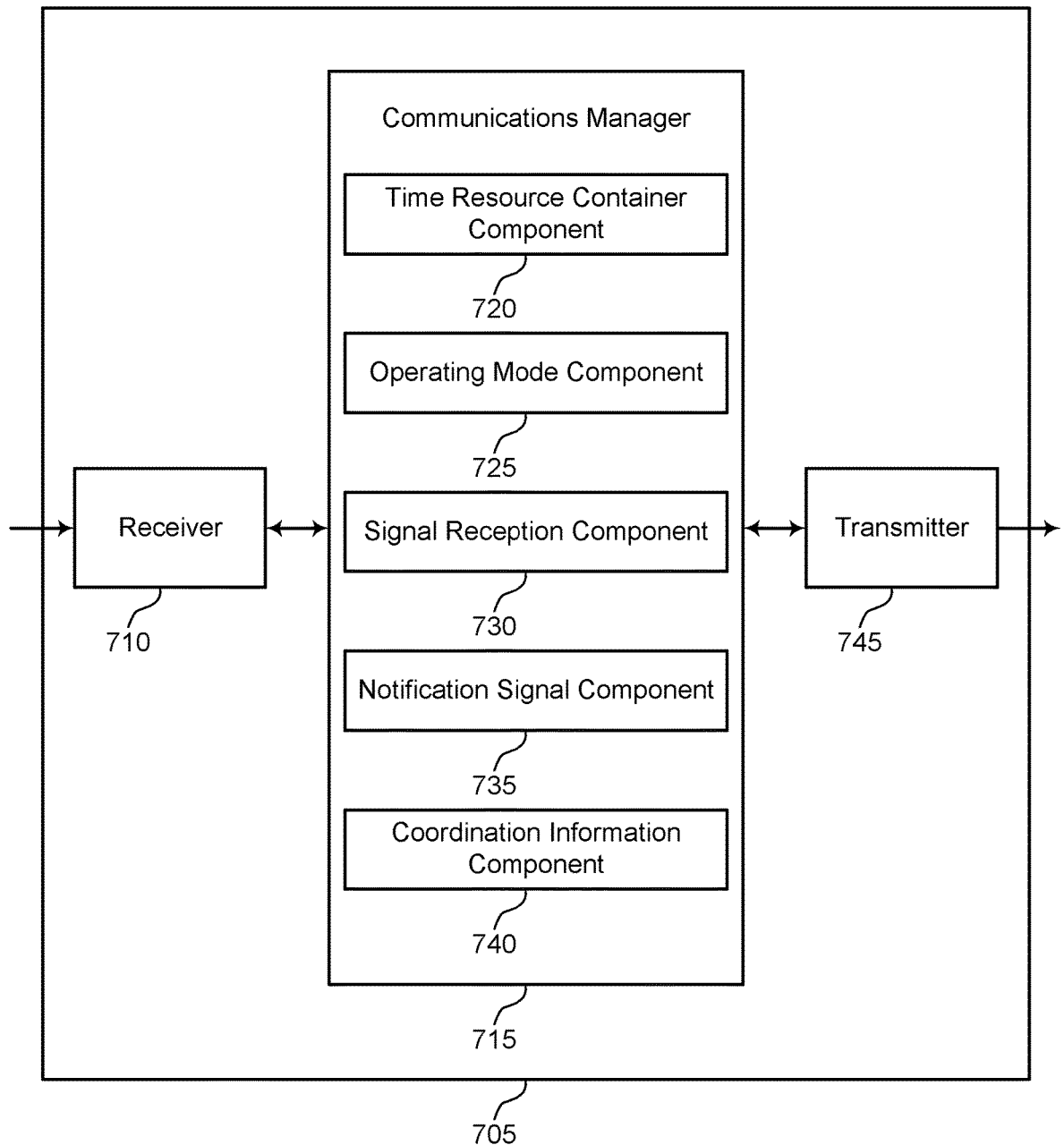

FIG. 7 shows a block diagram of a device 705 that supports coordination notifications in wireless backhaul systems in accordance with aspects of the present disclosure. The device 705 may be an example of aspects of a device 605, a network device 105, a UE 115, or another wireless device. The device 705 may include a receiver 710, a communications manager 715, and a transmitter 745. The communications manager 715 may be implemented, at least in part, by one or both of a modem and a processor. Each of these components may be in communication with one another (for example, via one or more buses).

The receiver 710 may receive information such as packets, user data, or control information associated with various information channels (for example, control channels, data channels, and information related to coordination notifications in wireless backhaul systems). Information may be passed on to other components of the device 705. The receiver 710 may be an example of aspects of the transceiver 920 described with reference to FIG. 9. The receiver 710 may utilize a single antenna or a set of antennas.

The communications manager 715 may include a time resource container component 720, an operating mode component 725, a signal reception component 730, a notification signal component 735, and a coordination information component 740.

The time resource container component 720 may determine a configuration of a time resource container for communicating an indication of coordination information associated with access nodes of a network, the time resource container including a set of time resources. The operating mode component 725 may enable an operating mode for amplifying and forwarding a signal based one determining the configuration of the time resource container. The signal reception component 730 may receive, from a second access node of the access nodes and while in the operating mode, a signal in a first subset of the set of time resources of the time resource container. The notification signal component 735 may amplify and forward, in the time resource container and while in the operating mode, the signal to a third access node of the access nodes, the forwarded signal including a notification signal including the indication of the coordination information.

The coordination information component 740 may determine coordination information associated with access nodes of a network. The time resource container component 720 may determine a configuration of a time resource container for communicating an indication of the coordination information associated with the access nodes, the time resource container including a set of time resources. The notification signal component 735 may communicate, with a second access node of the access nodes and based on the configuration of the time resource container, a notification signal in a first subset of the set of time resources of the time resource container, in which the notification signal includes the indication of the coordination information.

The transmitter 745 may transmit signals generated by other components of the device 705. In some examples, the transmitter 745 may be collocated with a receiver 710 in a transceiver component. For example, the transmitter 745 may be an example of aspects of the transceiver 920 described with reference to FIG. 9. The transmitter 745 may utilize a single antenna or a set of antennas.

A processor of a wireless device (for example, controlling the receiver 710, the transmitter 745, or the transceiver 920 as described with reference to FIG. 9) may increase communication reliability and accuracy by enabling the wireless device to reduce latency associated with coordination signaling within a network. The reduced latency may reduce transmission delays and overhead (for example, via implementation of system components described with reference to FIG. 8) compared to other systems and techniques, for example, that decode a signal and then transmit the signal, which may increase propagation delay. Further, the processor of the UE 115 may identify one or more aspects of a coordination notification signaling configuration to perform the processes described herein. The processor of the wireless device may use the coordination notification signaling configuration to perform one or more actions that may result in higher communication accuracy and communication reliability, as well as save power and increase battery life at the wireless device (for example, by reducing overhead, improving network coordination, and decreasing signaling time), among other benefits.

Figure 8:
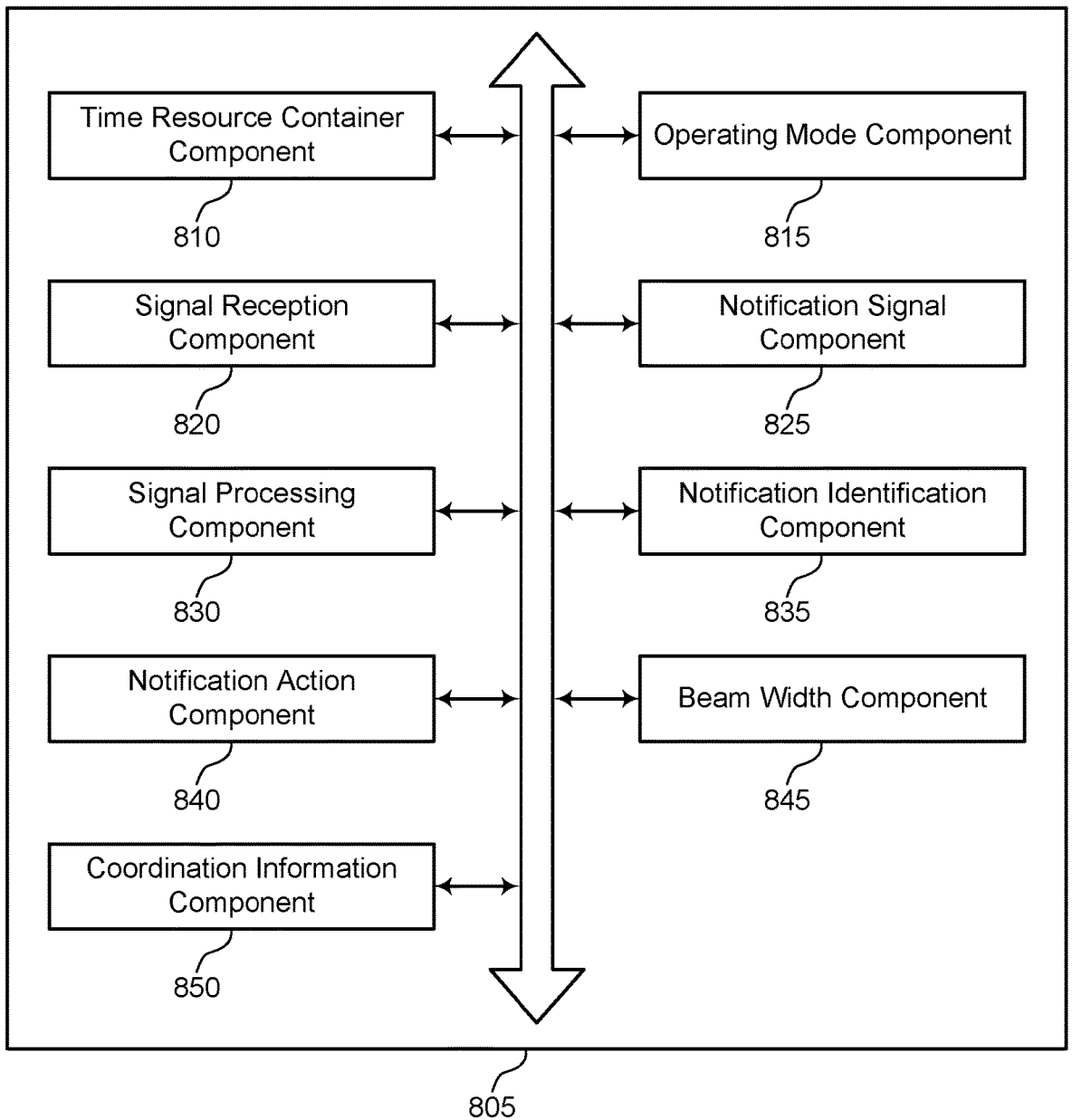
FIG. 8 shows a block diagram of a communications manager that supports coordination notifications in wireless backhaul systems in accordance with aspects of the present disclosure.

FIG. 8 shows a block diagram of a communications manager 805 that supports coordination notifications in wireless backhaul systems in accordance with aspects of the present disclosure. The communications manager 805 may be an example of aspects of a communications manager 615, a communications manager 715, or a communications manager 910 described herein. The communications manager 805 may include a time resource container component 810, an operating mode component 815, a signal reception component 820, a notification signal component 825, a signal processing component 830, a notification identification component 835, a notification action component 840, a beam width component 845, and a coordination information component 850. Each of these components may communicate, directly or indirectly, with one another (for example, via one or more buses).

The time resource container component 810 may determine a configuration of a time resource container for communicating an indication of coordination information associated with access nodes of a network, the time resource container including a set of time resources. In some examples, the time resource container component 810 may determine a configuration of a time resource container for communicating an indication of the coordination information associated with the access nodes, the time resource container including a set of time resources. In some examples, determining the configuration of the time resource container may further include configuring the time resource container for communicating the indication of the coordination information associated with the access nodes.

In some examples, determining the configuration of the time resource container includes determining that the configuration includes multiple subsets of the symbol. In some examples, the time resource container component 810 may receive an indication of the configuration of the time resource container, in which determining the configuration of the time resource container or determining the configuration of the time resource container is based on receiving the indication of the configuration. In some examples, the time resource container component 810 may determine configuration information stored at the first access node, in which determining the configuration of the time resource container is based on the configuration information stored at the first access node.

In some examples, the time resource container component 810 may determine the configuration such that one or more other signals or channels are overlaid with the notification signal to overlap in time and be separated from the notification signal in one or more of frequency or code domain. In some examples, the time resource container component 810 may determine the configuration such that one or more other signals or channels are overlaid with the notification signal, and may communicate a second signal with one or more of the access nodes concurrent with amplifying and forwarding the signal. In some examples, the second signal is associated with one or more of a PDCCH, a PDSCH, an SSB, a CSI-RS, a PUCCH, a PUSCH, or a PRACH.

In some examples, a length of the time resource container is less than or equal to a symbol. In some examples, a first sub-symbol of the time resource container is configured for downlink coordination, or a second sub-symbol of the time resource container is configured for uplink coordination, or one or more remaining sub-symbols of the time resource container are configured for one or more other physical channels or signals, or any combination thereof. In some examples, the time resource container includes one of a set of time resource containers within a slot. In some examples, a second subset of the time resource container includes a signaling gap, the second subset including a remainder of the time resource container different than the first subset. In some examples, a duration of the time resource container is greater than or equal to a sum of the duration of the notification signal and a duration of a propagation latency between two or more of the access nodes in the network.

The operating mode component 815 may enable an operating mode for amplifying and forwarding a signal based one determining the configuration of the time resource container.

The signal reception component 820 may receive, from a second access node of the access nodes and while in the operating mode, a signal in a first subset of the set of time resources of the time resource container. In some examples, receiving the signal in the first subset includes receiving the signal including the indication of the coordination information.

The notification signal component 825 may amplify and forward, in the time resource container and while in the operating mode, the signal to a third access node of the access nodes, the forwarded signal including a notification signal including the indication of the coordination information. In some examples, notification signal component 825 may communicate, with a second access node of the access nodes and based on the configuration of the time resource container, a notification signal in a first subset of the set of time resources of the time resource container, in which the notification signal includes the indication of the coordination information.

In some examples, receiving the signal from the second access node includes receiving the signal from a parent IAB node, and in which amplifying and forwarding the signal to the third access node includes amplifying and forwarding the signal to a child IAB node. In some examples, receiving the signal from the second access node includes receiving the signal from a child IAB node, and in which amplifying and forwarding the signal to the third access node includes amplifying and forwarding the signal to a parent IAB node.

In some examples, amplifying and forwarding the signal to the third access node includes amplifying and forwarding the signal independently of whether the notification signal is present within the time resource container. In some examples, the notification signal component 825 may determine a characteristic of the signal, in which amplifying and forwarding the signal to the third access node is based on determining the characteristic of the signal. In some examples, determining the characteristic of the signal includes determining an energy level indicated by the signal, in which amplifying and forwarding the signal to the third access node is based on determining the energy level indicated by the signal. In some examples, determining that the energy level indicated by the signal is below a threshold, in which amplifying and forwarding the signal includes amplifying and forwarding a first subset of the signal and refraining from amplifying and forwarding a remainder of the signal based on determining that the energy level indicated by the signal is below the threshold.

In some examples, the notification signal component 825 may transmit the notification signal to the second access node, in which the second access node is an IAB node and is a parent access node or a child access node of the first access node. In some examples, the notification signal component 825 may receive the notification signal from a child IAB node, in which the notification signal includes an uplink transmission. In some examples, the notification signal component 825 may transmit the notification signal to a child IAB node, in which the notification signal includes a downlink transmission. In some examples, the first access node includes an IAB node and the indication includes a notification of synchronization loss. In some examples, the first access node includes a donor IAB node.

In some examples, the notification signal includes one or more of a flag indicating a notification scheme, an access node association ID indicating one or more access nodes of the access nodes that the notification signal is intended for, a notification type indicating a cause of the notification signal, one or more actions to be performed by the first access node or one or more other access nodes, an action time indicating when to initiate an action after detection of the notification signal, or a delay-critical message or packet. In some examples, the access node association ID includes a route ID, the route ID corresponding to one or more routes for IAB nodes in the network. In some examples, the notification type indicating the cause of the notification signal includes one or more of an indication of an URLLC communication or an indication of synchronization loss. In some examples, the delay-critical message or packet includes a message or a packet having URLLC communication information. In some examples, the notification signal includes an on-off signal, in which an absence of the notification signal indicates an absence of the indication of the coordination information.

The signal processing component 830 may store the signal. In some examples, the signal processing component 830 may decode the signal after amplifying and forwarding the signal to the third access node.

The notification identification component 835 may compare the access node association ID indicated in the notification signal with one or more IDs associated with the first access node. In some examples, the notification identification component 835 may verify that the notification is intended for the first access node based on comparing the access node association ID with the one or more IDs associated with the first access node. In some examples, the notification identification component 835 may determine that the notification signal is intended for an access node different than the first access node based on comparing the access node association ID with the one or more IDs associated with the first access node.

The notification action component 840 may determine one or more actions associated with the notification signal based on verifying that the notification is intended for the first access node. In some examples, the notification action component 840 may perform the one or more actions. In some examples, the notification action component 840 may override one or more resource types for receiving or transmitting of URLLC communication based on a notification of in-coming URLLC communication information, configuring additional PDCCH resources within a slot based on a notification of in-coming URLLC communication information, initiating activation of another access node for communication based on a notification of a synchronization loss. In some examples, the notification action component 840 may refrain from performing the one or more actions associated with the notification based on determining that the notification is intended for the access node different than the first access node.

In some examples, the notification action component 840 may override a previous resource configuration based on the indication of receiving the URLLC communication information. In some examples, the notification action component 840 may receive the URLLC communication information based on the indication of receiving the URLLC communication information. In some examples, the notification action component 840 may transmit the URLLC communication information to another access node of the access nodes.

In some examples, the notification action component 840 may override a previous resource configuration based on the indication of the URLLC communication information. In some examples, the notification action component 840 may receive the URLLC communication information. In some examples, the notification action component 840 may transmit the URLLC communication information to another access node of the access nodes.

The beam width component 845 may determine a quantity of access nodes associated with the first access node in one or more of uplink or downlink. In some examples, the beam width component 845 may determine a width of a beam to be used for receiving the signal, forwarding the signal, or transmitting the signal based on determining the quantity of access nodes, in which one or more of receiving the signal, forwarding the signal, or transmitting the signal is based on determining the width of the beam.

The coordination information component 850 may determine coordination information associated with access nodes of a network.

Figure 9:
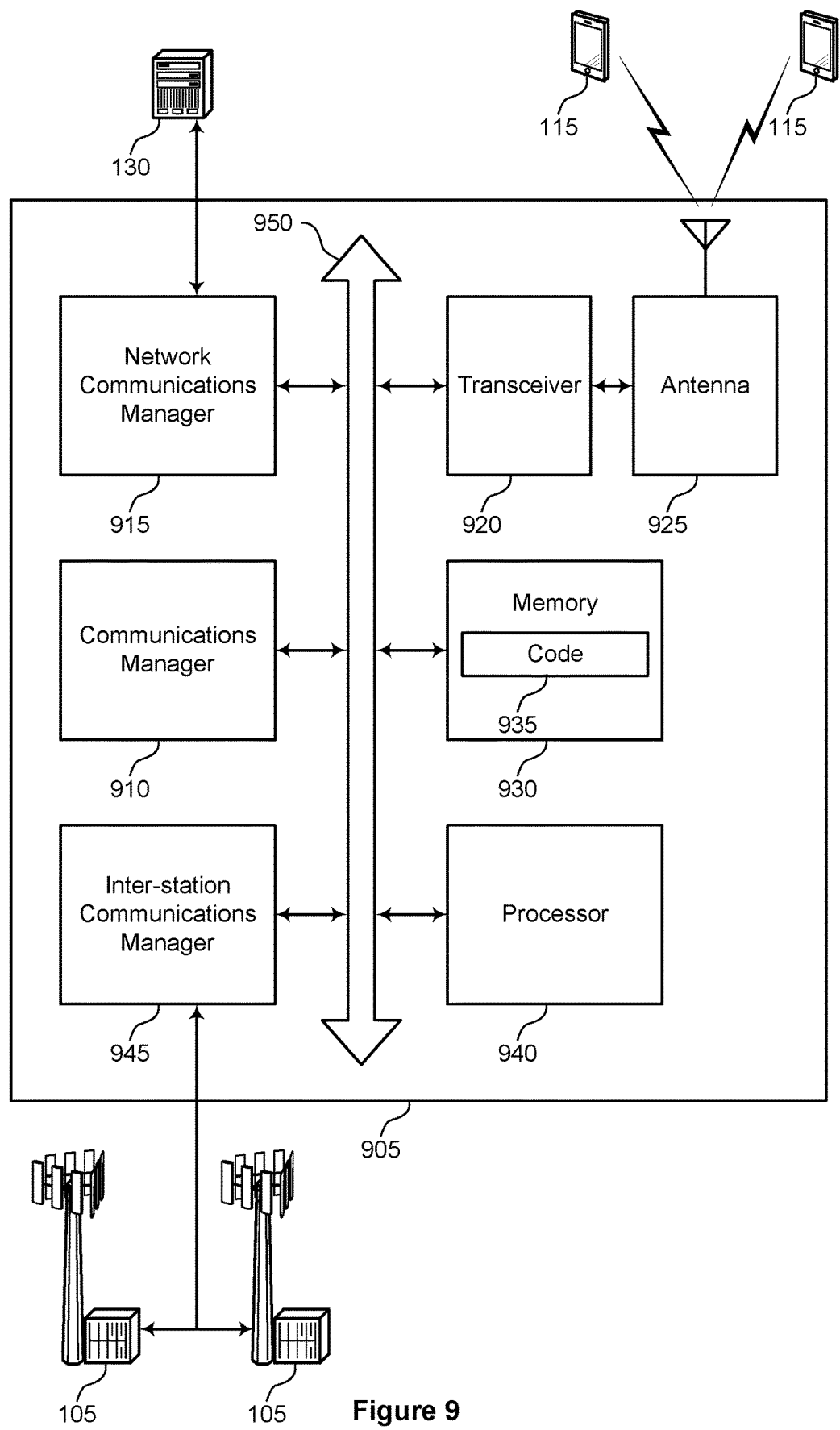
FIG. 9 shows a diagram of a system including a device that supports coordination notifications in wireless backhaul systems in accordance with aspects of the present disclosure.

FIG. 9 shows a diagram of a system including a device 905 that supports coordination notifications in wireless backhaul systems in accordance with aspects of the present disclosure. The device 905 may be an example of or include the components of device 605, device 705, network device 105, a UE 115, or another wireless device. The device 905 may include components for bi-directional voice and data communications including components for transmitting and receiving communications, including a communications manager 910, a network communications manager 915, a transceiver 920, an antenna 925, memory 930, a processor 940, and an inter-station communications manager 945. These components may be in electronic communication via one or more buses (for example, bus 950).

The communications manager 910 may determine a configuration of a time resource container for communicating an indication of coordination information associated with access nodes of a network, the time resource container including a set of time resources; enable an operating mode for amplifying and forwarding a signal based one determining the configuration of the time resource container; receive, from a second access node of the access nodes and while in the operating mode, a signal in a first subset of the set of time resources of the time resource container; and amplify and forward, in the time resource container and while in the operating mode, the signal to a third access node of the access nodes, the forwarded signal including a notification signal including the indication of the coordination information.

The communications manager 910 may also determine coordination information associated with access nodes of a network; determine a configuration of a time resource container for communicating an indication of the coordination information associated with the access nodes, the time resource container including a set of time resources; and communicate, with a second access node of the access nodes and based on the configuration of the time resource container, a notification signal in a first subset of the set of time resources of the time resource container, in which the notification signal includes the indication of the coordination information.

The network communications manager 915 may manage communications with the core network (for example, via one or more wired backhaul links). For example, the network communications manager 915 may manage the transfer of data communications for client devices, such as one or more UEs 115.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some examples, the wireless device may include a single antenna 925. However, in some examples the device may have more than one antenna 925, which may be capable of concurrently transmitting or receiving multiple wireless transmissions.

The memory 930 may include random access memory (RAM), read only memory (ROM), or a combination thereof. The memory 930 may store computer-readable code 935 including instructions that, when executed by a processor (for example, the processor 940) cause the device to perform various functions described herein. In some examples, the memory 930 may contain, among other things, a basic I/O system (BIOS) which may control basic hardware or software operation such as the interaction with peripheral components or devices.

The processor 940 may include an intelligent hardware device, (for example, a general-purpose processor, a digital signal processor (DSP), a CPU, a microcontroller, an application specific integrated circuit (ASIC), a field-programmable gate array (FPGA), a programmable logic device, a discrete gate or transistor logic component, a discrete hardware component, or any combination thereof). In some examples, the processor 940 may be configured to operate a memory array using a memory controller. In some examples, a memory controller may be integrated into processor 940. The processor 940 may be configured to execute computer-readable instructions stored in a memory (for example, the memory 930) to cause the device 905 to perform various functions (for example, functions or tasks supporting coordination notifications in wireless backhaul systems).

The inter-station communications manager 945 may manage communications with other access nodes or wireless devices, and may include a controller or scheduler for controlling communications with UEs 115 in cooperation with network devices 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communication network technology to provide communication between network devices 105.

The code 935 may include instructions to implement aspects of the present disclosure, including instructions to support wireless communications. The code 935 may be stored in a non-transitory computer-readable medium such as system memory or other type of memory. In some examples, the code 935 may not be directly executable by the processor 940 but may cause a computer (for example, when compiled and executed) to perform functions described herein.

Figure 10:
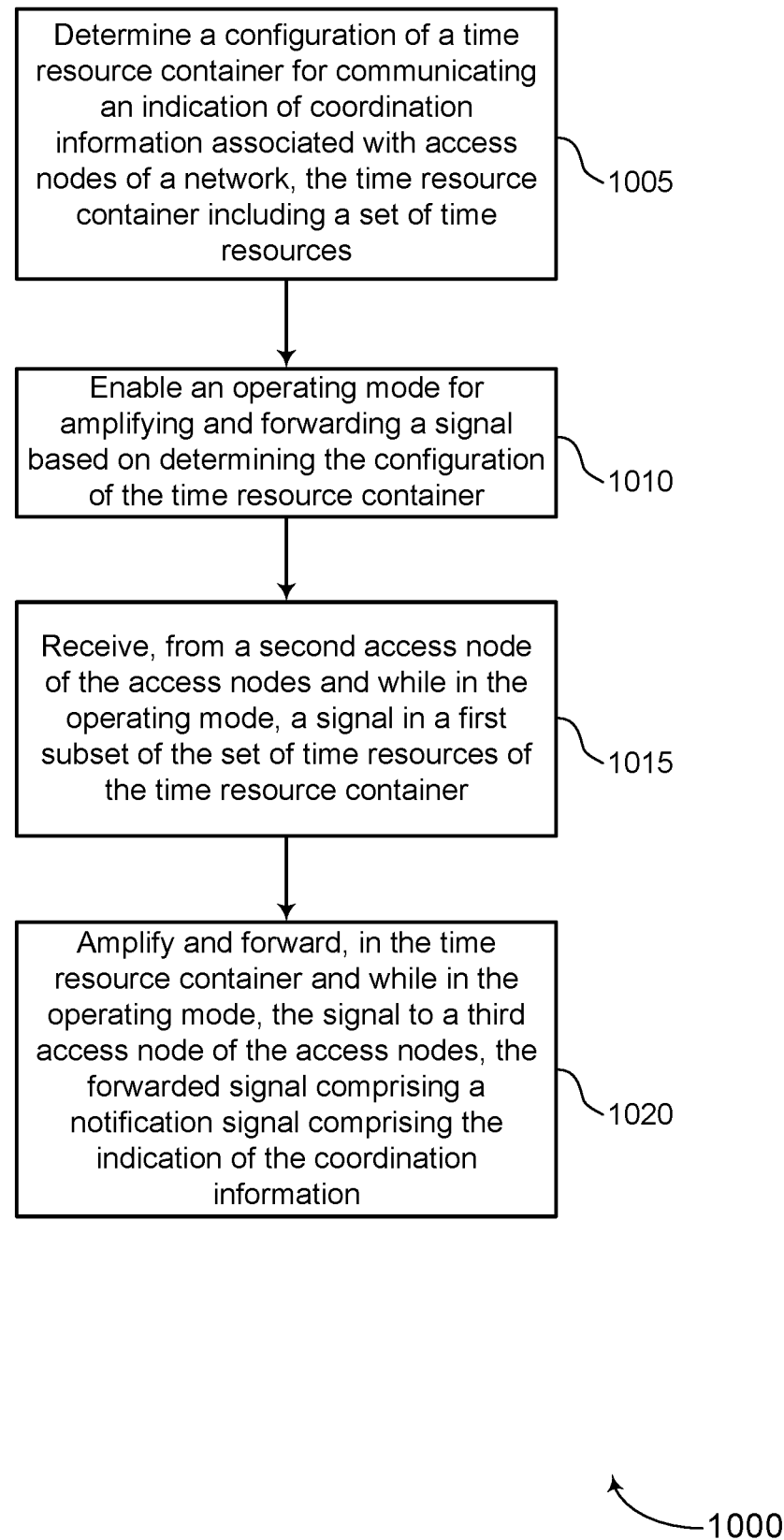
FIGS. 10 through 15 show flowcharts illustrating methods that support coordination notifications in wireless backhaul systems in accordance with aspects of the present disclosure.

FIG. 10 shows a flowchart illustrating a method 1000 that supports coordination notifications in wireless backhaul systems in accordance with aspects of the present disclosure. The operations of method 1000 may be implemented by a network device 105, a UE 115, or another wireless device or its components. For example, the operations of method 1000 may be performed by a communications manager as described with reference to FIGS. 6-9. In some examples, an access node (such as a base station, network device, or UE, among other examples) may execute a set of instructions to control the functional elements of the access node to perform the functions described below. Additionally or alternatively, an access node may perform aspects of the functions described below using special-purpose hardware.

At 1005, the access node may determine a configuration of a time resource container for communicating an indication of coordination information associated with access nodes of a network, the time resource container including a set of time resources. The operations of 1005 may be performed according to the methods described herein. In some examples, aspects of the operations of 1005 may be performed by a time resource container component as described with reference to FIGS. 6-9.

At 1010, the access node may enable an operating mode for amplifying and forwarding a signal based one determining the configuration of the time resource container. The operations of 1010 may be performed according to the methods described herein. In some examples, aspects of the operations of 1010 may be performed by a component as described with reference to FIGS. 6-9.

At 1015, the access node may receive, from a second access node of the access nodes and while in the operating mode, a signal in a first subset of the set of time resources of the time resource container. The operations of 1015 may be performed according to the methods described herein. In some examples, aspects of the operations of 1015 may be performed by a signal reception component as described with reference to FIGS. 6-9.

At 1020, the access node may amplify and forward, in the time resource container and while in the operating mode, the signal to a third access node of the access nodes, the forwarded signal including a notification signal including the indication of the coordination information. The operations of 1020 may be performed according to the methods described herein. In some examples, aspects of the operations of 1020 may be performed by a notification signal component as described with reference to FIGS. 6-9.

Figure 11:
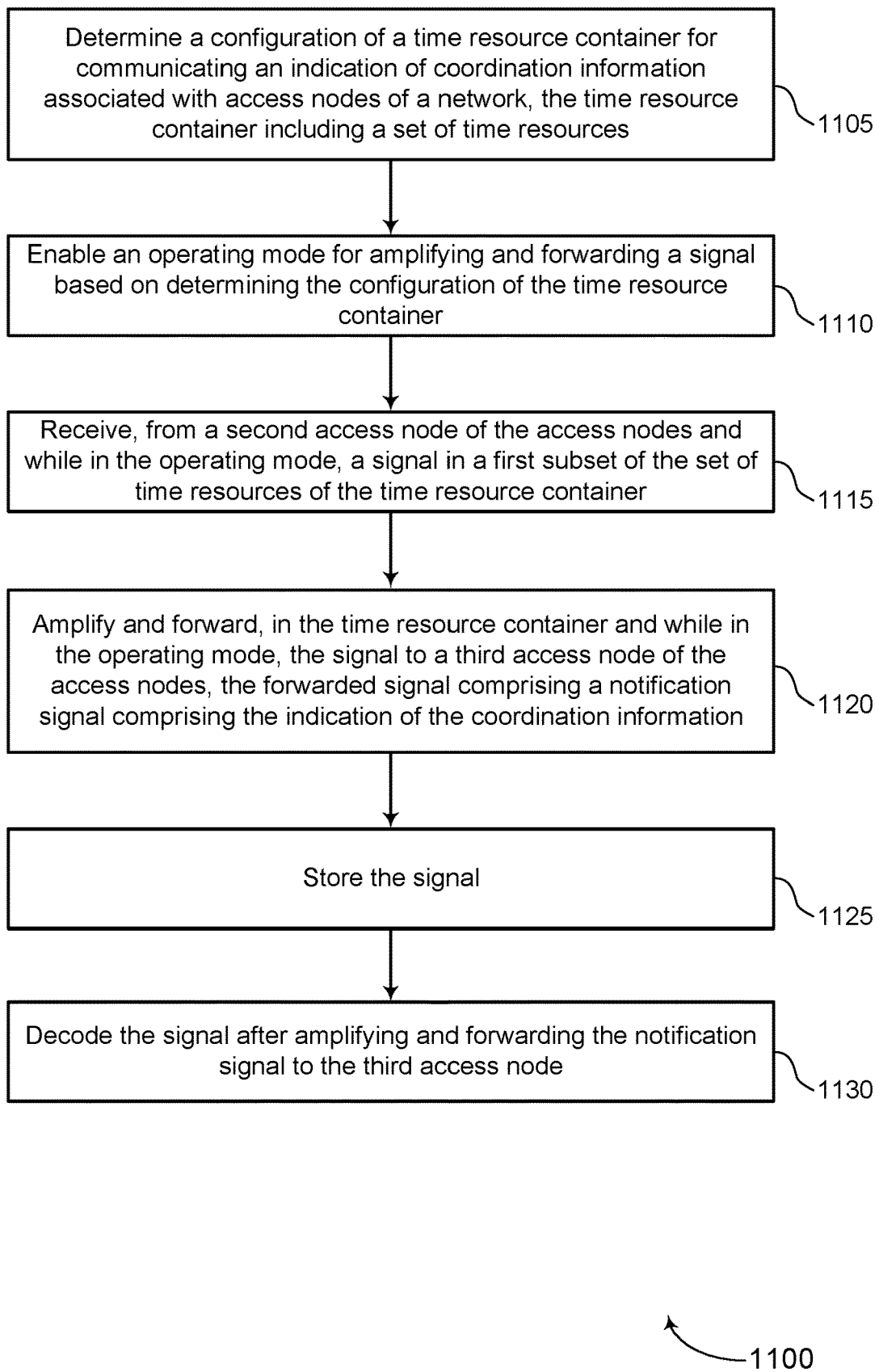

FIG. 11 shows a flowchart illustrating a method 1100 that supports coordination notifications in wireless backhaul systems in accordance with aspects of the present disclosure. The operations of method 1100 may be implemented by a network device 105, a UE 115, or another wireless device or its components. For example, the operations of method 1100 may be performed by a communications manager as described with reference to FIGS. 6-9. In some examples, an access node (such as a base station, network device, or UE, among other examples) may execute a set of instructions to control the functional elements of the access node to perform the functions described below. Additionally or alternatively, an access node may perform aspects of the functions described below using special-purpose hardware.

At 1105, the access node may determine a configuration of a time resource container for communicating an indication of coordination information associated with access nodes of a network, the time resource container including a set of time resources. The operations of 1105 may be performed according to the methods described herein. In some examples, aspects of the operations of 1105 may be performed by a time resource container component as described with reference to FIGS. 6-9.

At 1110, the access node may enable an operating mode for amplifying and forwarding a signal based one determining the configuration of the time resource container. The operations of 1110 may be performed according to the methods described herein. In some examples, aspects of the operations of 1110 may be performed by a component as described with reference to FIGS. 6-9.

At 1115, the access node may receive, from a second access node of the access nodes and while in the operating mode, a signal in a first subset of the set of time resources of the time resource container. The operations of 1115 may be performed according to the methods described herein. In some examples, aspects of the operations of 1115 may be performed by a signal reception component as described with reference to FIGS. 6-9.

At 1120, the access node may amplify and forward, in the time resource container and while in the operating mode, the signal to a third access node of the access nodes, the forwarded signal including a notification signal including the indication of the coordination information. The operations of 1125 may be performed according to the methods described herein. In some examples, aspects of the operations of 1125 may be performed by a notification signal component as described with reference to FIGS. 6-9.

At 1125, the access node may store the signal. The operations of 1120 may be performed according to the methods described herein. In some examples, aspects of the operations of 1120 may be performed by a signal processing component as described with reference to FIGS. 6-9.

At 1130, the access node may decode the signal after amplifying and forwarding the signal to the third access node. The operations of 1130 may be performed according to the methods described herein. In some examples, aspects of the operations of 1130 may be performed by a signal processing component as described with reference to FIGS. 6-9.

Figure 12:
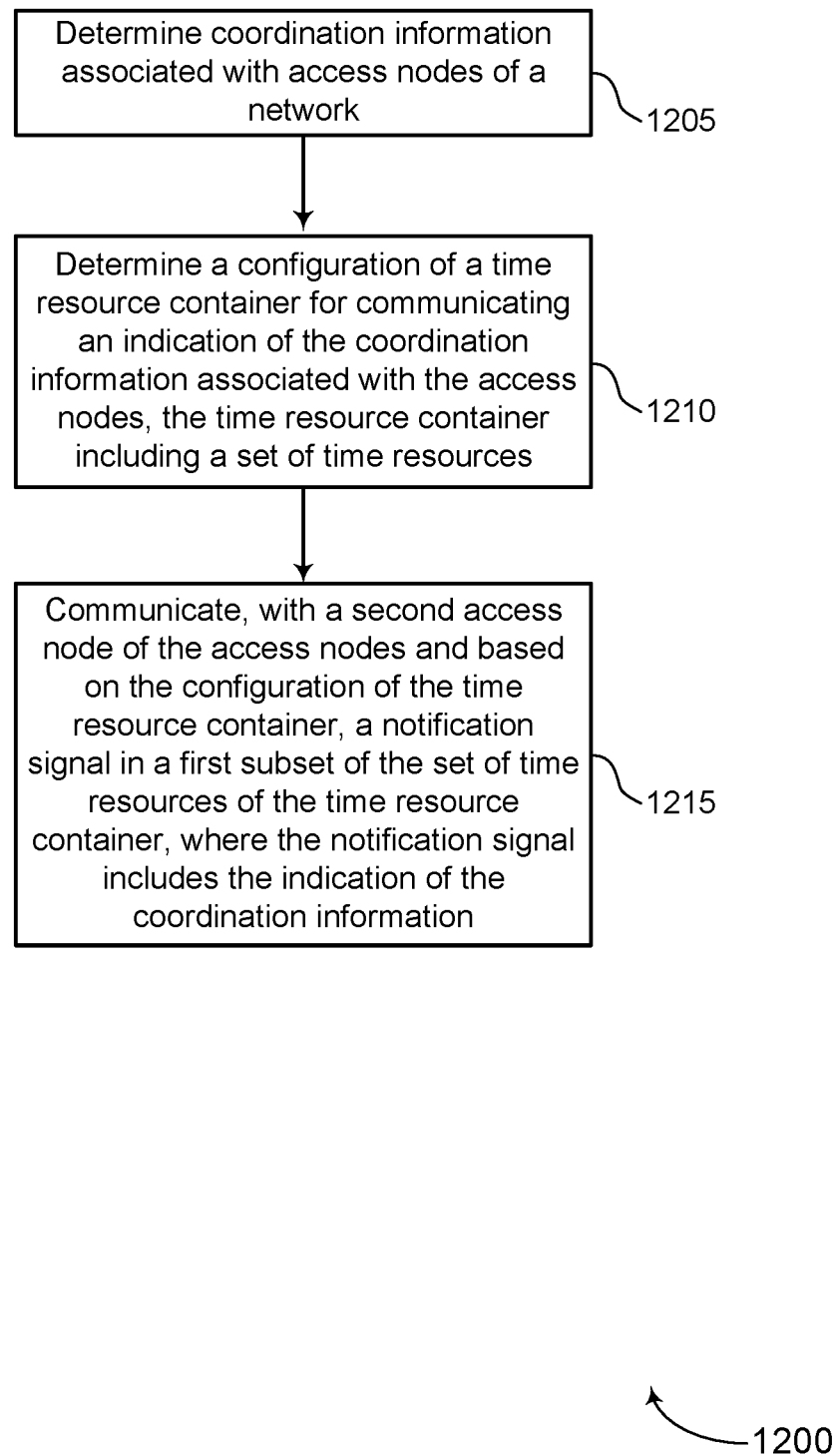

FIG. 12 shows a flowchart illustrating a method 1200 that supports coordination notifications in wireless backhaul systems in accordance with aspects of the present disclosure. The operations of method 1200 may be implemented by a network device 105, a UE 115, or another wireless device or its components. For example, the operations of method 1200 may be performed by a communications manager as described with reference to FIGS. 6-9. In some examples, an access node (such as a base station, network device, or UE, among other examples) may execute a set of instructions to control the functional elements of the access node to perform the functions described below. Additionally or alternatively, an access node may perform aspects of the functions described below using special-purpose hardware.

At 1205, the access node may determine coordination information associated with access nodes of a network. The operations of 1205 may be performed according to the methods described herein. In some examples, aspects of the operations of 1205 may be performed by a coordination information component as described with reference to FIGS. 6-9.

At 1210, the access node may determine a configuration of a time resource container for communicating an indication of the coordination information associated with the access nodes, the time resource container including a set of time resources. In some examples, determining the time resource container may include determining a time resource that has been configured by one or more other nodes (for example, by a donor access node). The operations of 1210 may be performed according to the methods described herein. In some examples, aspects of the operations of 1210 may be performed by a time resource container component as described with reference to FIGS. 6-9.

Additionally or alternatively, the access node may configure a time resource container for communicating an indication of the coordination information associated with the access nodes, the time resource container including a set of time resources. For example, the access node may be or include a donor access node and may configure the time resource container for the donor access node and for one or more other access nodes. The operations of 1210 may be performed according to the methods described herein. In some examples, aspects of the operations of 1210 may be performed by a time resource container component as described with reference to FIGS. 6-9.

At 1215, the access node may communicate, with a second access node of the access nodes and based on the configuration of the time resource container, a notification signal in a first subset of the set of time resources of the time resource container, in which the notification signal includes the indication of the coordination information. The operations of 1215 may be performed according to the methods described herein. In some examples, aspects of the operations of 1215 may be performed by a notification signal component as described with reference to FIGS. 6-9.

Figure 13:
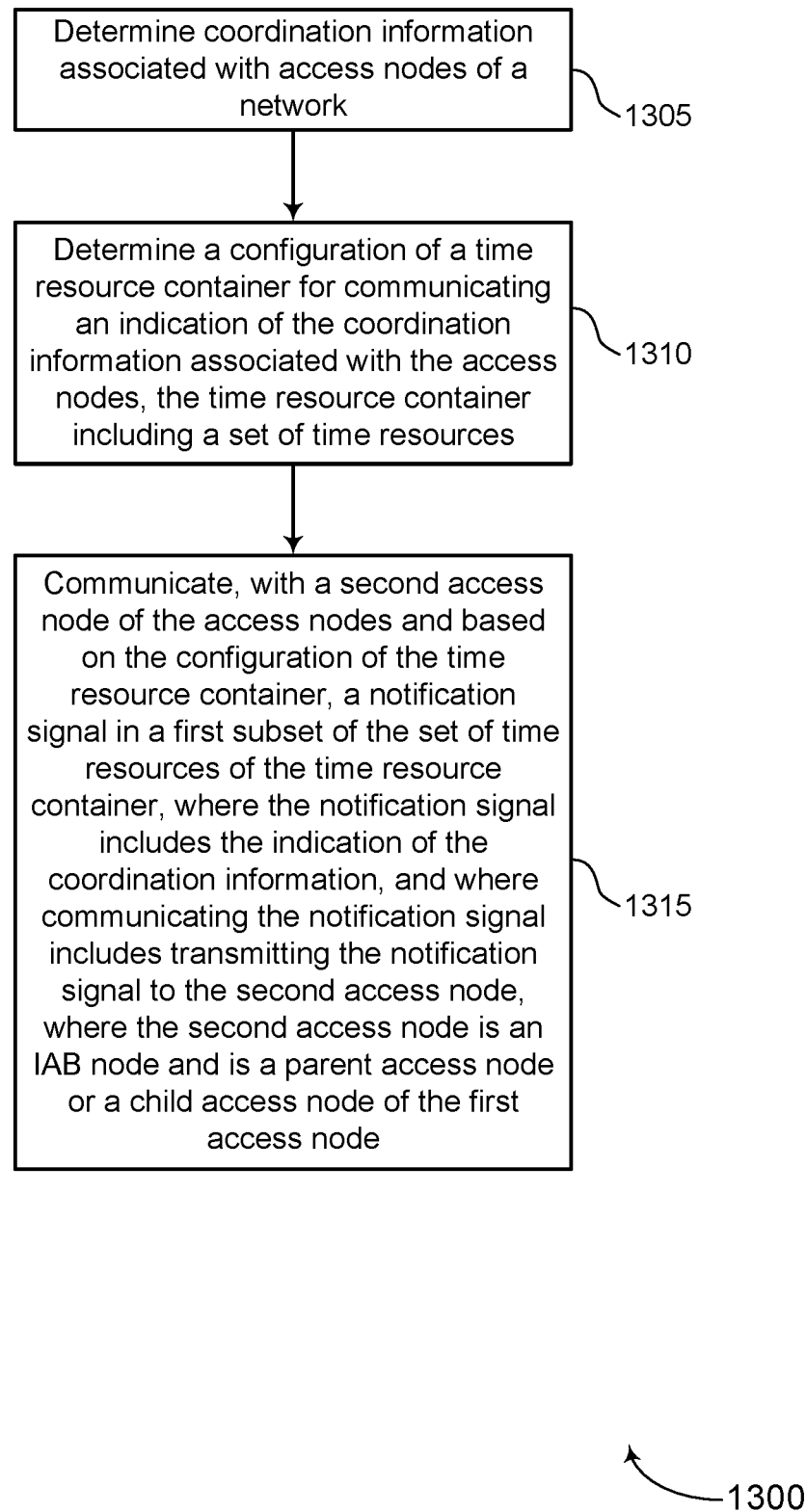

FIG. 13 shows a flowchart illustrating a method 1300 that supports coordination notifications in wireless backhaul systems in accordance with aspects of the present disclosure. The operations of method 1300 may be implemented by a network device 105, a UE 115, or another wireless device or its components. For example, the operations of method 1300 may be performed by a communications manager as described with reference to FIGS. 6-9. In some examples, an access node (such as a base station, network device, or UE, among other examples) may execute a set of instructions to control the functional elements of the access node to perform the functions described below. Additionally or alternatively, an access node may perform aspects of the functions described below using special-purpose hardware.

At 1305, the access node may determine coordination information associated with access nodes of a network. The operations of 1305 may be performed according to the methods described herein. In some examples, aspects of the operations of 1305 may be performed by a coordination information component as described with reference to FIGS. 6-9.

At 1310, the access node may determine a configuration of a time resource container for communicating an indication of the coordination information associated with the access nodes, the time resource container including a set of time resources. In some examples, determining the time resource container may include determining a time resource that has been configured by one or more other nodes (for example, by a donor access node). The operations of 1310 may be performed according to the methods described herein. In some examples, aspects of the operations of 1310 may be performed by a time resource container component as described with reference to FIGS. 6-9.

At 1315, the access node may communicate, with a second access node of the access nodes and based on the configuration of the time resource container, a notification signal in a first subset of the set of time resources of the time resource container, in which the notification signal includes the indication of the coordination information. In some examples, the access node may transmit the notification signal to the second access node, in which the second access node is an IAB node and is a parent access node or a child access node of the first access node. The operations of 1315 may be performed according to the methods described herein. In some examples, aspects of the operations of 1315 may be performed by a notification signal component as described with reference to FIGS. 6-9.

Figure 14:
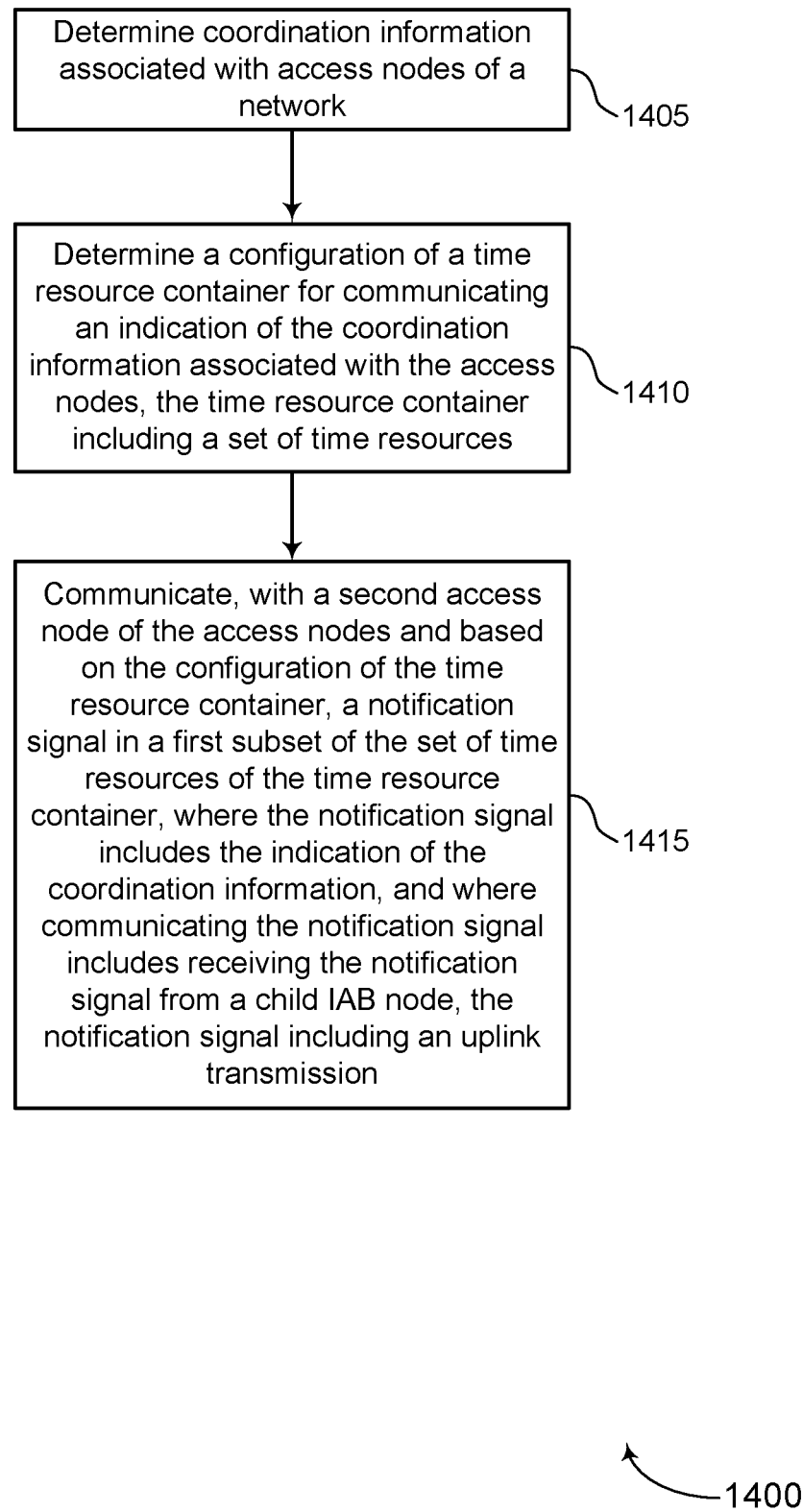

FIG. 14 shows a flowchart illustrating a method 1400 that supports coordination notifications in wireless backhaul systems in accordance with aspects of the present disclosure. The operations of method 1400 may be implemented by a network device 105, a UE 115, or another wireless device or its components. For example, the operations of method 1400 may be performed by a communications manager as described with reference to FIGS. 6-9. In some examples, an access node (such as a base station, network device, or UE, among other examples) may execute a set of instructions to control the functional elements of the access node to perform the functions described below. Additionally or alternatively, an access node may perform aspects of the functions described below using special-purpose hardware.

At 1405, the access node may determine coordination information associated with access nodes of a network. The operations of 1405 may be performed according to the methods described herein. In some examples, aspects of the operations of 1405 may be performed by a coordination information component as described with reference to FIGS. 6-9.

At 1410, the access node may determine a configuration of a time resource container for communicating an indication of the coordination information associated with the access nodes, the time resource container including a set of time resources. In some examples, determining the time resource container may include determining a time resource that has been configured by one or more other nodes (for example, by a donor access node). The operations of 1410 may be performed according to the methods described herein. In some examples, aspects of the operations of 1410 may be performed by a time resource container component as described with reference to FIGS. 6-9.

At 1415, the access node may communicate, with a second access node of the access nodes and based on the configuration of the time resource container, a notification signal in a first subset of the set of time resources of the time resource container, in which the notification signal includes the indication of the coordination information. In some examples, the access node may receive the notification signal from a child IAB node, in which the notification signal includes an uplink transmission. The operations of 1415 may be performed according to the methods described herein. In some examples, aspects of the operations of 1415 may be performed by a notification signal component as described with reference to FIGS. 6-9.

Figure 15:
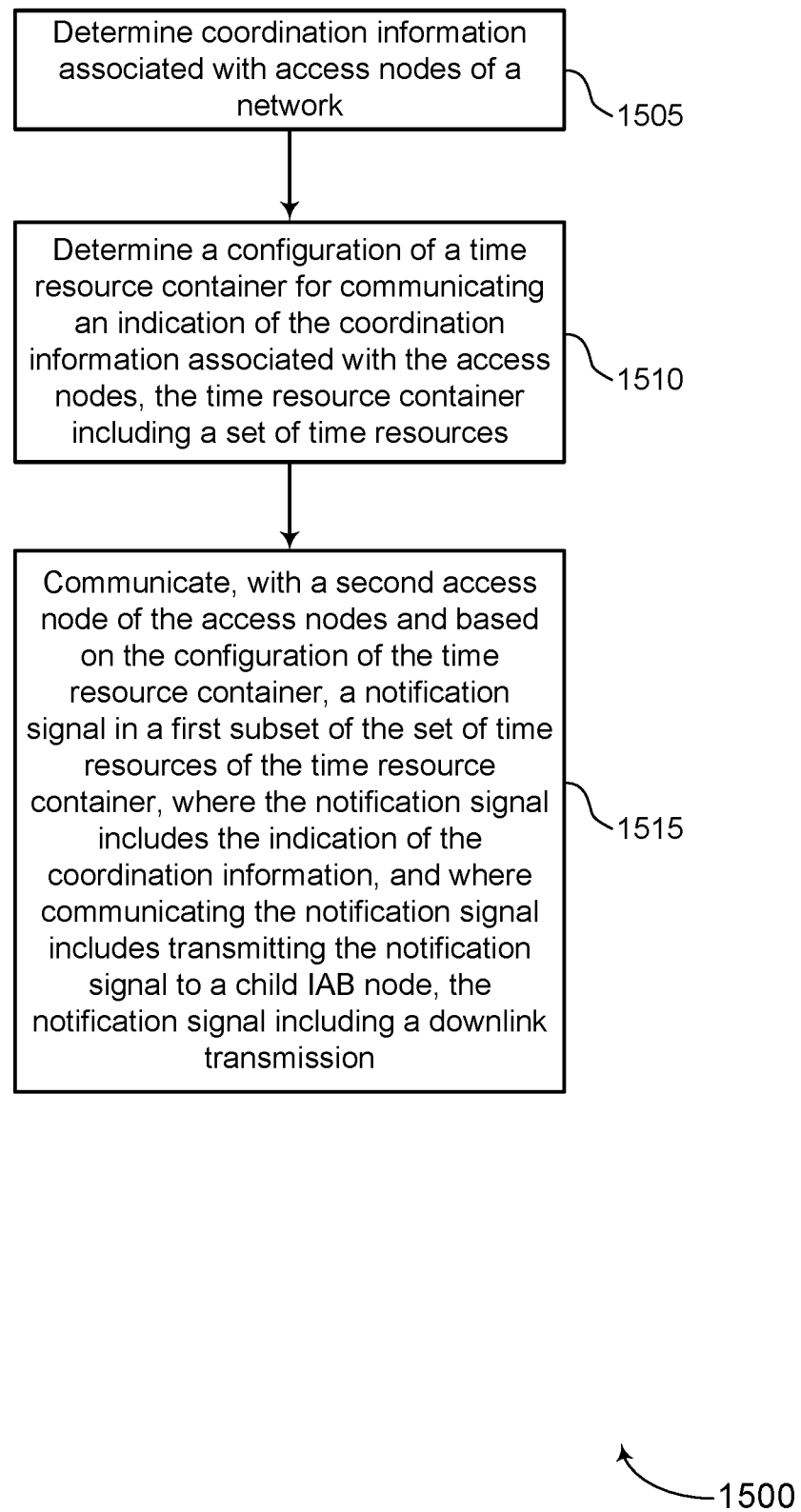

FIG. 15 shows a flowchart illustrating a method 1500 that supports coordination notifications in wireless backhaul systems in accordance with aspects of the present disclosure. The operations of method 1500 may be implemented by a network device 105, a UE 115, or another wireless device or its components. For example, the operations of method 1500 may be performed by a communications manager as described with reference to FIGS. 6-9. In some examples, an access node (such as a base station, network device, or UE, among other examples) may execute a set of instructions to control the functional elements of the access node to perform the functions described below. Additionally or alternatively, an access node may perform aspects of the functions described below using special-purpose hardware.

At 1505, the access node may determine coordination information associated with access nodes of a network. The operations of 1505 may be performed according to the methods described herein. In some examples, aspects of the operations of 1505 may be performed by a coordination information component as described with reference to FIGS. 6-9.

At 1510, the access node may determine a configuration of a time resource container for communicating an indication of the coordination information associated with the access nodes, the time resource container including a set of time resources. In some examples, determining the time resource container may include determining a time resource that has been configured by one or more other nodes (for example, by a donor access node). The operations of 1510 may be performed according to the methods described herein. In some examples, aspects of the operations of 1510 may be performed by a time resource container component as described with reference to FIGS. 6-9.

At 1515, the access node may communicate, with a second access node of the access nodes and based on the configuration of the time resource container, a notification signal in a first subset of the set of time resources of the time resource container, in which the notification signal includes the indication of the coordination information. In some examples, the access node may transmit the notification signal to a child IAB node, in which the notification signal includes a downlink transmission. The operations of 1515 may be performed according to the methods described herein. In some examples, aspects of the operations of 1515 may be performed by a notification signal component as described with reference to FIGS. 6-9.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (for example, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form to avoid obscuring the concepts of the described examples.

The description herein is provided to enable a person having ordinary skill in the art to make or use the disclosure. Various modifications to the disclosure will be understood by a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first access node, comprising:
   determining a configuration of a time resource container configured for receiving and forwarding an indication of coordination information associated with access nodes of a network, the time resource container comprising a set of time resources having a total duration less than or equal to a symbol length;
   enabling an operating mode for amplifying and forwarding a signal based at least in part on determining the configuration of the time resource container;
   receiving, from a second access node of the access nodes and while in the operating mode, a signal in a first subset of the set of time resources of the time resource container; and
   amplifying and forwarding, in the first subset of the set of time resources of the time resource container and while in the operating mode, the signal to a third access node of the access nodes, the forwarded signal comprising a notification signal comprising the indication of the coordination information.

2. The method of claim 1, wherein the signal in the first subset of the set of time resources comprises the indication of the coordination information.

3. The method of claim 1, further comprising:
   storing the signal; and
   decoding the signal after amplifying and forwarding the signal to the third access node.

4. The method of claim 3, wherein the notification signal comprises one or more of a flag indicating a notification scheme, an access node association identifier indicating one or more access nodes of the access nodes for which the notification signal is intended, a notification type indicating a cause of the notification signal, one or more actions to be performed at the first access node or one or more other access nodes, an action time indicating when to initiate an action after detection of the notification signal, or a delay-critical message or packet.

5. The method of claim 4, further comprising:
   comparing the access node association identifier indicated in the notification signal with one or more identifiers associated with the first access node;
   verifying that the notification signal is intended for the first access node based at least in part on comparing the access node association identifier with the one or more identifiers associated with the first access node;
   determining one or more actions associated with the notification signal based at least in part on verifying that the notification signal is intended for the first access node; and
   performing the one or more actions.

6. The method of claim 5, wherein the one or more actions comprise one or more of overriding one or more resource types for receiving or transmitting of ultra-reliable low-latency communication based at least in part on a notification of in-coming ultra-reliable low-latency communication information, configuring additional physical downlink control channel resources within a slot based at least in part on a notification of in-coming ultra-reliable low-latency communication information, or initiating activation of another access node for communication based at least in part on a notification of a synchronization loss.

7. The method of claim 4, further comprising:
   comparing the access node association identifier indicated in the notification signal with one or more identifiers associated with the first access node;
   determining that the notification signal is intended for an access node different than the first access node based at least in part on comparing the access node association identifier with the one or more identifiers associated with the first access node; and
   refraining from performing the one or more actions associated with the notification signal based at least in part on determining that the notification signal is intended for the access node different than the first access node.

8. The method of claim 4, wherein the access node association identifier comprises a route identifier, the route identifier corresponding to one or more routes for integrated access/backhaul nodes in the network.

9. The method of claim 4, wherein the notification type indicating the cause of the notification signal comprises one or more of an indication of an ultra-reliable low-latency communication or an indication of synchronization loss.

10. The method of claim 4, wherein the notification signal comprises an on-off signal, and wherein an absence of the notification signal indicates an absence of the indication of the coordination information.

11. The method of claim 1, wherein determining the configuration of the time resource container comprises determining that the configuration comprises multiple subsets of a symbol.

12. The method of claim 11, wherein:
   the first subset of the set of time resources comprises a first sub-symbol of the time resource container that is configured for downlink coordination, or
   the first subset of the set of time resources comprises a second sub-symbol of the time resource container that is configured for uplink coordination, or
   the first subset of the set of time resources comprises one or more remaining sub-symbols of the time resource container that are configured for one or more other physical channels or signals, or
   any combination thereof.

13. The method of claim 1, wherein the time resource container comprises one of a set of time resource containers within a slot.

14. The method of claim 1, further comprising receiving an indication of the configuration of the time resource container, wherein determining the configuration of the time resource container is based at least in part on receiving the indication of the configuration.

15. The method of claim 1, further comprising determining configuration information stored at the first access node, wherein determining the configuration of the time resource container is based at least in part on the configuration information stored at the first access node.

16. The method of claim 1, wherein a second subset of the set of time resources of the time resource container comprises a signaling gap, the second subset comprising a remainder of the time resource container different than the first subset.

17. The method of claim 1, wherein a duration of the time resource container is greater than or equal to a sum of the duration of the notification signal and a duration of a propagation latency between two or more of the access nodes in the network.

18. The method of claim 1, wherein the second access node is a parent integrated access/backhaul node, and the third access node is a child integrated access/backhaul node.

19. The method of claim 1, wherein the second access node is a child integrated access/backhaul node, and the third access node is a parent integrated access/backhaul node.

20. The method of claim 1, wherein amplifying and forwarding the signal to the third access node comprises amplifying and forwarding the signal independently of whether the notification signal is present within the time resource container.

21. The method of claim 1, further comprising determining a characteristic of the signal, wherein amplifying and forwarding the signal to the third access node is based at least in part on determining the characteristic of the signal.

22. The method of claim 21, further comprising:
determining an energy level indicated by the signal, wherein the characteristic of the signal comprises the energy level indicated by the signal; and
determining that the energy level indicated by the signal is below a threshold, wherein amplifying and forwarding the signal comprises amplifying and forwarding a portion of the signal and refraining from amplifying and forwarding a remainder of the signal based at least in part on determining that the energy level indicated by the signal is below the threshold.

23. The method of claim 1, further comprising:
determining a quantity of the access nodes of the network associated with the first access node in one or more of an uplink direction or a downlink direction; and
determining a width of a beam to be used for receiving the signal or forwarding the signal based at least in part on the quantity of access nodes, wherein one or more of receiving the signal or forwarding the signal is based at least in part on the width of the beam.

24. The method of claim 1, wherein the signal comprises an indication of ultra-reliable low-latency communication information to be received, the method further comprising:
overriding a previous resource configuration based at least in part on the indication of receiving the ultra-reliable low-latency communication information;
receiving the ultra-reliable low-latency communication information based at least in part on the indication of receiving the ultra-reliable low-latency communication information; and
transmitting the ultra-reliable low-latency communication information to another access node of the access nodes.

25. The method of claim 1, wherein determining the configuration of the time resource container comprises determining the configuration such that one or more other signals or channels are overlaid with the notification signal to overlap in time and are separated from the notification signal in one or more of a frequency or a code domain.

26. The method of claim 1, wherein determining the configuration of the time resource container comprises determining the configuration such that one or more other signals or channels are overlaid with the notification signal, the method further comprising communicating a second signal with one or more of the access nodes of the network concurrently with amplifying and forwarding the signal.

27. An apparatus for wireless communication at a first access node, comprising:
a processor,
memory coupled with the processor; and
instructions stored in the memory and executable by the processor to cause the apparatus to:
determine a configuration of a time resource container configured for receiving and forwarding an indication of coordination information associated with access nodes of a network, the time resource container comprising a set of time resources having a duration less than or equal to a symbol length;
enable an operating mode for amplifying and forwarding a signal based at least in part on determining the configuration of the time resource container;
receive, from a second access node of the access nodes and while in the operating mode, a signal in a first subset of the set of time resources of the time resource container; and
amplify and forward, in the first subset of the set of time resources of the time resource container and while in the operating mode, the signal to a third access node of the access nodes, the forwarded signal comprising a notification signal comprising the indication of the coordination information.

28. An apparatus for wireless communication at a first access node, comprising:
means for determining a configuration of a time resource container configured for receiving and forwarding an indication of coordination information associated with access nodes of a network, the time resource container comprising a set of time resources having a duration less than or equal to a symbol length;
means for enabling an operating mode for amplifying and forwarding a signal based at least in part on determining the configuration of the time resource container;
means for receiving, from a second access node of the access nodes and while in the operating mode, a signal in a first subset of the set of time resources of the time resource container; and
means for amplifying and forwarding, in the first subset of the set of time resources of the time resource container and while in the operating mode, the signal to a third access node of the access nodes, the forwarded signal comprising a notification signal comprising the indication of the coordination information.

29. A non-transitory computer-readable medium storing code for wireless communication at a first access node, the code comprising instructions executable by a processor to:
determine a configuration of a time resource container configured for receiving and forwarding an indication of coordination information associated with access nodes of a network, the time resource container comprising a set of time resources having a duration less than or equal to a symbol length;
enable an operating mode for amplifying and forwarding a signal based at least in part on determining the configuration of the time resource container;
receive, from a second access node of the access nodes and while in the operating mode, a signal in a first subset of the set of time resources of the time resource container; and
amplify and forward, in the first subset of the set of time resources of the time resource container and while in the operating mode, the signal to a third access node of the access nodes, the forwarded signal comprising a notification signal comprising the indication of the coordination information.

* * * * *